United States Patent
Roe et al.

(10) Patent No.: US 10,425,247 B2
(45) Date of Patent: Sep. 24, 2019

(54) SYSTEMS AND METHODS FOR MODIFYING PLAYBACK OF A MEDIA ASSET IN RESPONSE TO A VERBAL COMMAND UNRELATED TO PLAYBACK OF THE MEDIA ASSET

(71) Applicant: Rovi Guides, Inc., San Jose, CA (US)

(72) Inventors: Glen E. Roe, Simi Valley, CA (US); Michael McCarty, Agoura Hills, CA (US); Charles Dawes, Tyne & Wear (GB); Milan Patel, Santa Clara, CA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 15/839,540

(22) Filed: Dec. 12, 2017

(65) Prior Publication Data

US 2019/0182072 A1    Jun. 13, 2019

(51) Int. Cl.
| | |
|---|---|
| *H04L 12/28* | (2006.01) |
| *H04W 4/21* | (2018.01) |
| *G06F 3/16* | (2006.01) |
| *H04N 21/442* | (2011.01) |
| *H04N 21/472* | (2011.01) |

(52) U.S. Cl.
CPC ......... *H04L 12/2829* (2013.01); *G06F 3/167* (2013.01); *H04N 21/44218* (2013.01); *H04N 21/47217* (2013.01); *H04W 4/21* (2018.02)

(58) Field of Classification Search
None
See application file for complete search history.

(56) References Cited

U.S. PATENT DOCUMENTS

| | | |
|---|---|---|
| 6,239,794 B1 | 5/2001 | Yuen |
| 6,564,378 B1 | 5/2003 | Satterfield |

(Continued)

FOREIGN PATENT DOCUMENTS

AU    2017101191    10/2017

OTHER PUBLICATIONS

PCT International Partial Search Report for International Application No. PCTUS2018039669, dated Oct. 23, 2018 (15 pages).

(Continued)

*Primary Examiner* — Jason K Lin
(74) *Attorney, Agent, or Firm* — Haley Guiliano LLP

(57) ABSTRACT

Systems and methods are described for translating a non-playback command into a playback modification to encourage a recipient of the command to execute on the command. A media guidance application may determine a command from a first user to a second user. The media guidance application may compare the command to a set of playback operation commands for a media asset that is currently being played back. The media guidance application may determine that the command is not contained within the set of playback operation commands. In response to determining that the command is not contained within the set of commands, the media guidance application may determine whether the second user executes a desired outcome of the command. And in response to determining that the second user does not execute the desired outcome of the command, the media guidance application may determine whether to modify playback of the media asset.

20 Claims, 14 Drawing Sheets

(56) References Cited

U.S. PATENT DOCUMENTS

| | | | |
|---|---|---|---|
| 7,165,098 B1 | 1/2007 | Boyer | |
| 7,761,892 B2 | 7/2010 | Ellis | |
| 8,046,801 B2 | 10/2011 | Ellis | |
| 8,738,377 B2 * | 5/2014 | Byrne | G10L 15/22 |
| | | | 455/417 |
| 9,541,909 B2 | 1/2017 | Olsson | |
| 2002/0174430 A1 | 11/2002 | Ellis | |
| 2003/0070182 A1 | 4/2003 | Pierre | |
| 2003/0097659 A1 * | 5/2003 | Goldman | H04L 29/06027 |
| | | | 725/89 |
| 2005/0251827 A1 | 11/2005 | Ellis | |
| 2010/0115568 A1 | 5/2010 | Gupta et al. | |
| 2010/0153885 A1 | 6/2010 | Yates | |
| 2010/0306708 A1 | 12/2010 | Trenz | |
| 2015/0163558 A1 | 6/2015 | Wheatley | |
| 2015/0172878 A1 | 6/2015 | Luna | |
| 2015/0228281 A1 * | 8/2015 | Raniere | G06F 3/167 |
| | | | 704/275 |
| 2015/0264439 A1 | 9/2015 | Karlin | |
| 2015/0309483 A1 * | 10/2015 | Lyman | G05B 15/02 |
| | | | 700/275 |
| 2016/0100379 A1 | 4/2016 | Nguyen et al. | |
| 2017/0236514 A1 * | 8/2017 | Nelson | G10L 15/18 |
| | | | 704/257 |
| 2017/0242657 A1 * | 8/2017 | Jarvis | G06F 3/167 |
| 2017/0332036 A1 | 11/2017 | Panchaksharaiah | |
| 2017/0332125 A1 | 11/2017 | Panchaksharaiah | |
| 2017/0332140 A1 | 11/2017 | Blake | |
| 2018/0070187 A1 * | 3/2018 | Drinkwater | G06F 3/165 |

OTHER PUBLICATIONS

PCT International Search Report and Written Opinion for International Application No. PCTUS2018039669, dated Feb. 11, 2019 (24 pages).

U.S. Appl. No. 15/839,569, filed Dec. 12, 2017, Glen E. Roe.

* cited by examiner

SYSTEMS AND METHODS FOR MODIFYING PLAYBACK OF A MEDIA ASSET IN RESPONSE TO A VERBAL COMMAND UNRELATED TO PLAYBACK OF THE MEDIA ASSET

BACKGROUND

Modifying playback of a media asset in response to a verbal command or a detected sound is a technique used to help encourage a recipient of the command to perform an action based on the command. The related art describes various ways of modifying playback based on a verbal command related to playback. For example, the related art describes systems that detect verbal commands related to playback (e.g., the user saying "Alexa, please pause the movie"), and then modifies playback based on the detected command. Typical media applications look for commands that relate to guidance operations, but fail to consider how to operate when non-guidance commands are received. The related art also can pick up ambient sounds and perform a playback operation in response to the detected sound. However, the related art does not describe different modes of operation based on whether the user is or is not authorized to perform an action that meets a goal of the sound.

SUMMARY

Systems and methods are provided herein for translating a command unrelated to playback into a pertinent playback modification to encourage a recipient of the command to execute on the command. For example, if a first user is watching a movie, and a second user calls out to the first user "Dinner's ready!", playback of the movie may be paused to encourage the first user to stop watching the movie and go eat dinner.

To this end and others, in some aspects of the disclosure, a media guidance application may detect a command from a first user to a second user. The first user may be a user not currently watching playback of a media asset, and may be in an environment outside of the viewing environment of the media asset. The second user may be a user currently viewing playback of a media asset within the viewing environment of the media asset. For example, the media guidance application may detect a verbal command (e.g., "Come to the table for dinner!") from the first user to the second user using an intelligent personal assistant device (e.g., an Amazon Echo).

In some embodiments, when the media guidance application detects the command from the first user to the second user, the media guidance application may detect verbal input from the first user. For example, the media guidance application may detect, using an audio detection sensor, a verbal input (e.g., the user saying "Dinner's ready!") from the first user.

The media guidance application may compare the verbal input to a database of commands, where the database contains commands corresponding to each verbal input. For example, the media guidance application may compare the verbal input (e.g., the user saying "Dinner's ready!") to a database containing commands (e.g., eat dinner, answer the door, clean, vacuum, etc.).

The media guidance application may determine, from the comparison, a command corresponding to the verbal input from the first user. For example, the media guidance application may determine, from the user profile, that the verbal input (e.g., "Dinner's ready!") corresponds to the command (e.g., eat dinner) using pattern recognition between the input and the command.

In some embodiments, when the media guidance application determines from the comparison a command corresponding to the verbal input from the first user, the media guidance application may determine a match between the verbal input and the database of commands. For example, the media guidance application may determine that the verbal input (e.g., "Dinner's ready!") corresponds to the command (e.g., eat dinner) because the verbal input matches keywords contained in the command (e.g., "dinner"). The media guidance application may determine that the command corresponding to the match (e.g., eat dinner) is the command corresponding to the verbal input from the first user.

The media guidance application may compare the command to a set of playback operation commands for a media asset that is currently being played back by the second user. For example, the media guidance application may compare the command (e.g., eat dinner) to a set of playback operation commands (e.g., pause, fast-forward, mute, etc.) for a media asset (e.g., a movie) that is currently being played back by the second user.

In response to the comparison, the media guidance application may determine that the command is not contained within the set of playback operation commands. For example, the media guidance application may determine that the command (e.g., eat dinner) is not contained within the set of playback operation commands (e.g., pause, fastforward, mute, etc.).

The media guidance application may determine, based on a user profile of the first user and a user profile of the second user, a desired outcome of the command from a plurality of outcomes of the command. For example, the media guidance application may determine a desired outcome of the command (e.g., the second user stops watching the movie and eats dinner) based on a user profile of the first user (e.g., the profile may state that the first user is a mom) and a user profile of the second user (e.g., the second profile may state that the second user is the mom's son who obeys the mom's commands).

In some embodiments, when the media guidance application is determining, based on the user profile of the first user and the user profile of the second user, the desired outcome of the command from the plurality of outcomes of the command, the media guidance application may determine attributes of the command. For example, the media guidance application may determine attributes of the command (e.g., the speaker of the command, the tone of the command, seriousness of the command, etc.) based on comparing the command to entries of a database of attributes.

The media guidance application may compare the attributes of the command to attributes of the plurality of outcomes of the command. For example, the media guidance application may compare the attributes of the command (e.g., the speaker of the command, the tone of the command, seriousness of the command, purpose of the command, etc.) to attributes of the plurality of outcomes of the command (e.g., a result if the command is followed, a result if the command is ignored, a consequence of following the command, a consequence of not following the command, etc.).

The media guidance application may determine, from the comparison, an outcome in the plurality of outcomes that contains attributes of the command to be the desired outcome. For example, the media guidance application may determine, from the comparison, an outcome (e.g., the user pauses the movie to go eat dinner) that contains attributes of the command (e.g., an intended consequence of the command) to be the desired outcome.

The media guidance application may detect an action executed by the second user. For example, the media guidance application may detect via a camera that the user has left the viewing environment where playback of the movie is occurring and has entered the dining room.

In some embodiments, when the media guidance application is detecting an action executed by the second user, the media guidance application may detect, using a sensor, the second user leaving a viewing environment of a media equipment device that is presenting the media asset. For example, the media guidance application may detect via a motion detection sensor that the second user is leaving the viewing environment of the television the user is watching a movie on.

In some embodiments, when the media guidance application is detecting an action executed by the second user, the media guidance application may detect the second user executing a command to modify playback of the media asset. For example, the media guidance application may detect the user pressing an input command on a remote control device, for example, "pause," to pause playback of the film the user is watching.

In some embodiments, when the media guidance application is detecting an action executed by the second user, the media guidance application may detect, using a sensor, that the second user stays in the viewing environment of a media asset device. For example, the media guidance application may detect, using a heat-mapping sensor, that the second user has not left the couch where the user is watching playback of the movie.

The media guidance application may compare the action of the second user to the desired outcome of the command. For example, the media guidance application may compare the action (e.g., the second user continuing to watch the movie) to the desired outcome of the command (e.g., the second user going to eat dinner).

In some embodiments, when comparing a characteristic from the retrieved characteristics of the second user to the command, the media guidance application may select the characteristic from a group of characteristics consisting of age, rank within the household, relationship to other users, and time of day, and the media guidance application may select the command from a group of commands consisting of eating, cleaning, studying, cooking, and sleeping.

The media guidance application may determine, from the comparison, whether the command shares a characteristic of the second user. For example, the media guidance application may determine, from the comparison, whether the command (e.g., eating) shares a characteristic of the second user (e.g., time of day).

In response to determining that the command shares the characteristic, the media guidance application may modify playback of the media asset. For example, in response to determining that the command shares the characteristic, the media guidance application may pause playback of the media asset.

In response to determining that the action of the second user does not correspond to the desired outcome of the command, the media guidance application may retrieve characteristics of the second user from the user profile of the second user. For example, the media guidance application may retrieve characteristics (e.g., age, relationship to the first user, user rank within household, etc.) from the user profile of the second user.

The media guidance application may determine whether to modify playback of the media asset based on the command detected from the first user and the retrieved characteristics of the second user. For example, the media guidance application may determine whether to modify playback (e.g., pause, mute, rewind, fast-forward, turn off, etc.) based on the command detected from the first user (e.g., eat dinner) and the characteristics of the second user (e.g., the second user must always obey commands from the first user).

In some embodiments, when the media guidance application is determining whether to modify playback of the media asset based on the command detected from the first user and the retrieved characteristics of the second user, the media guidance application may retrieve a rank of the first user and a rank of the second user. For example, the media guidance application may retrieve a rank of the first user (e.g., the first user is ranked first out of five users) and a rank of the second user (e.g., the second user is ranked forth out of five users).

The media guidance application may determine, from the rank, whether the first user is ranked higher than the second user. For example, the media guidance application may determine that the first user (e.g., ranked first) is ranked higher than the second user (e.g., ranked second).

In response to determining that the first user is ranked higher than the second user, the media guidance application may modify playback of the media asset. For example, in response to determining that the first user is ranked higher than the second user the media guidance application may modify playback of the media asset (e.g., pause the movie currently playing back).

In response to determining that the second user is ranked higher than the first user, the media guidance application may continue to play back the media asset. For example, in response to determining that the second user is ranked higher than the first user, the media guidance application may continue playback of the media asset (e.g., the movie the second user is watching).

In some embodiments, the media guidance application may detect a command from the first user to the second user and a third user. For example, the media guidance application may detect a command (e.g, eat dinner) from the first user to the second user and a third user.

The media guidance application may determine, based on a user profile of the first user, the user profile of the second user and a user profile of the third user, a desired outcome of the command from a plurality of outcomes of the command.

The media guidance application may detect a first action executed by the second user and a second action executed by the third user. For example, the media guidance application may detect a first action by the second user (e.g., the second user turns up the volume of the movie) and a second action executed by the third user (e.g., a motion sensor detecting that the third user leaves the viewing environment to go eat dinner).

The media guidance application may compare the action of the second user and the action of the third user to the desired outcome of the command. For example, the media guidance application may compare the action of the second user (e.g., turning up the volume of the movie via a remote) and the action of the third user (e.g., a motion sensor detecting the third user leaving the viewing environment) to the desired outcome of the command (e.g., the second and third users going to eat dinner).

In response to determining that the action of the second user and the action of the third user do not correspond to the desired outcome of the command, the media guidance application may retrieve characteristics of the second user from the user profile of the second user and characteristics of the third user from a user profile of the third user.

The media guidance application may determine whether to modify playback of the media asset based on the command detected from the first user and the retrieved characteristics of the second user and the retrieved characteristics of the third user. For example, the media guidance application may determine to modify playback of the media asset based on the command detected from the first user (e.g., eat dinner) and the retrieved characteristics of the first user (e.g., rank, etc.) and the retrieved characteristics of the third user (e.g., rank, etc.) because the first user outranks the ranks of the second and third user. As another example, the media guidance application may determine not to modify playback of the media asset based on the command detected from the first user (e.g., eat dinner) and the retrieved characteristics of the first user (e.g., rank, etc.) and the retrieved characteristics of the second and third user (e.g., rank, etc.) because ranks of the third user outrank the rank of the command and first user.

In some aspects of the disclosure, systems and methods are provided herein for determining whether a user is authorized to perform an action that meets a goal of a sound. For example, in response to detecting the doorbell ringing, the user may or may not be allowed to pause playback of a movie that the user is watching. If the user is a child and home alone, the user may not be allowed to pause playback of the movie, to encourage the user not to answer the door when home alone. If the user is a child and his/her parents are home, the user may be allowed to pause playback of the movie to answer the door.

To this end and others, in some aspects of the disclosure, a media guidance application may detect a sound generated by a first device external to a media equipment device. For example, the media guidance application may detect, using a sensor, a sound (e.g., a doorbell ringing) by a first device (e.g., a doorbell) external to a media equipment device (e.g., a television).

The media guidance application may store a database that associates a goal in a plurality of goals with a set of actions in a plurality of actions and a sound in a plurality of sounds. For example, the media guidance application may store a database that associates a goal (e.g., answer the door) in a plurality of goals (e.g., answer the door, answer the phone, leave the house, etc.) with a set of actions (e.g., continue watching playback of a media asset and ignore the doorbell) in a plurality of actions (e.g., pause playback of a media asset to answer the door, continue watching playback of a media asset and ignore the doorbell, etc.) and a sound (e.g., a doorbell ringing) in a plurality of sounds (e.g., doorbell ringing, phone ringing, smoke detector beeping, etc.).

The media guidance application may compare the sound generated by the first device with the database to determine a goal associated with the sound and a corresponding set of actions associated with the goal. For example, the media guidance application may compare the sound generated by the first device (e.g., a doorbell ringing) with the database to determine a goal associated with the sound (e.g., answer the door) and a corresponding set of actions associated with the goal (e.g., pause playback of the media asset, leave the viewing environment to answer the door, etc.).

In some embodiments, when comparing the sound generated by the first device with the database to determine a goal associated with the sound and a corresponding set of actions associated with the goal, the media guidance application may determine a match between the sound and an entry in the database based on characteristics of the sound. For example, the media guidance application may use characteristics of the sound (e.g., tone, loudness, frequency, etc.) to match the sound with its corresponding entry in the database.

The media guidance application may retrieve, from the entry, the goal associated with the sound. For example, the media guidance application may retrieve, from the entry, the goal (e.g., answer the door) associated with the sound (e.g., a doorbell ringing).

The media guidance application may retrieve, from the entry, the corresponding set of actions associated with the goal. For example, the media guidance application may retrieve, from the entry, the corresponding set of actions (e.g., pause playback of the media asset, mute the volume of playback of the media asset, etc.) associated with the goal (e.g., answer the door).

The media guidance application may detect a user in a viewing environment of the media equipment device. For example, the media guidance application may use a sensor (e.g., a camera) to detect the user in the viewing environment of the media equipment device (e.g., television).

In some embodiments, when detecting the user in the viewing environment of the media device, the media guidance application may detect, using a sensor, a presence of the user in the viewing environment. For example, the media guidance application may use an infrared sensor to detect the user in the viewing environment of the media equipment device (e.g., television).

The media guidance application may determine, from a user profile of the user, whether the user is authorized to perform an action in the determined set of actions associated with the goal. For example, the media guidance application may determine, from an authorization database in the user's profile, whether the user is authorized to leave the viewing environment associated with the goal (e.g., answer the door).

In some embodiments, when determining, from a user profile of the user, whether the user is authorized to perform an action in the determined set of actions associated with the goal, the media guidance application may retrieve, from the user profile, a rank for the user. For example, the media guidance application may retrieve a rank for the user (e.g., 8 out of 10).

The media guidance application may retrieve, from a database, a rank for an action. For example, the media guidance application may retrieve, from a database, a rank (e.g., 5 out of 10) for an action (e.g., leave the viewing environment).

The media guidance application may determine whether the rank for the user exceeds the rank for the action. For example, the media guidance application may determine that the rank for the user (e.g., 8 out of 10) exceeds the rank for the action (e.g., 5 out of 10).

In response to determining that the rank for the user exceeds the rank for the action, the media guidance application may determine that the user is authorized to perform the action. For example, the media guidance application may determine that the user is authorized to leave the viewing environment.

In response to determining that the user is authorized to perform the action, the media guidance application may generate a notification for the user indicating the detected sound. For example, the media guidance application may generate a sound notification (e.g., a doorbell sound) to play over playback of the media asset for the user indicating the detected sound.

In some embodiments, when generating a notification for the user indicating the detected sound, the media guidance application may generate an overlay to be displayed on the media equipment device, wherein the overlay contains a notification for the user about the sound. For example, the media guidance application may generate an overlay (e.g., an overlay stating, "The doorbell is ringing!") to be displayed on the media equipment device.

The media guidance application may modify playback of a media asset to allow the user to perform the action associated with the goal. For example, the media guidance application may modify playback of the media asset (e.g., pause a movie the user is watching) to allow the user to perform the action (e.g., leave the viewing environment) associated with the goal (e.g., answer the door).

In some embodiments, when modifying playback of a media asset to allow the user to perform the action associated with the goal, the media guidance application may retrieve, from the database, a set of playback modifications associated with the goal. For example, the media guidance application may retrieve, from the database, a set of playback modifications (e.g., pause, play, fast-forward, rewind, mute, turn on/off, etc.) associated with the goal.

The media guidance application may select a playback modification from the set of playback modifications based on preferences for the user. For example, the media guidance application may select a playback modification (e.g., pause) from the set of playback modifications based on preferences for the user (e.g., the user does not want to miss any content while answering the door).

The media guidance application may modify playback of the media asset based on the selected playback modification. For example, the media guidance application may modify playback of the media asset based on the selected playback modification (e.g., pause playback of the media asset).

In response to determining that the user is not authorized to perform the action, the media guidance application may generate a notification for a second user to perform the action. For example, the media guidance application may generate a notification (e.g., send an SMS message to the second user) to perform the action (e.g., answer the door).

In some embodiments, the media guidance application may determine that the sound is within an audible range of the viewing environment. For example, the media guidance application may detect the sound using a sensor (e.g., a microphone) contained within the viewing environment.

In response to determining that the user is not authorized to perform the action, the media guidance application may prevent the user from modifying playback of the media asset. For example, the media guidance application may prevent the user from modifying playback of the media guidance application (e.g., not allow the user to pause playback of the media asset).

The media guidance application may modify playback of the media asset to prevent the user from performing the action associated with the goal. For example, the media guidance application may increase the volume of playback of the media asset to drown out the sound within the user's audible range.

In some embodiments, when modifying playback of the media asset, the media guidance application may determine a volume that dampens the sound that is within the audible range. For example, the media guidance to application may determine a volume that is equivalent or higher than the determined volume of the sound within the audible range.

The media guidance application may adjust a volume corresponding to playback of the media asset to be the volume that dampens the sound. For example, the media guidance application may adjust the playback volume of the media asset to be a volume that is higher than the detected volume of the sound in the audible range.

BRIEF DESCRIPTION OF THE FIGURES

The below and other objects and advantages of the disclosure will be apparent upon consideration of the following detailed description, taken in conjunction with the accompanying drawings, in which like reference characters refer to like parts throughout, and in which.

DETAILED DESCRIPTION

Systems and methods are provided herein for translating a command unrelated to playback into a pertinent playback modification to encourage a recipient of the command to execute on the command. A media guidance application may determine a command from a first user to a second user. The media guidance application may compare the command to a set of playback operation commands for a media asset that is currently being played back. In response to the comparison, the media guidance application may determine that the command is not contained within the set of playback operation commands. In response to determining that the command is not contained within the set of playback operation commands, the media guidance application may determine whether the second user executes a desired outcome of the command. And in response to determining that the second user does not execute the desired outcome of the command, the media guidance application may determine whether to modify playback of the media asset.

Figure 1:
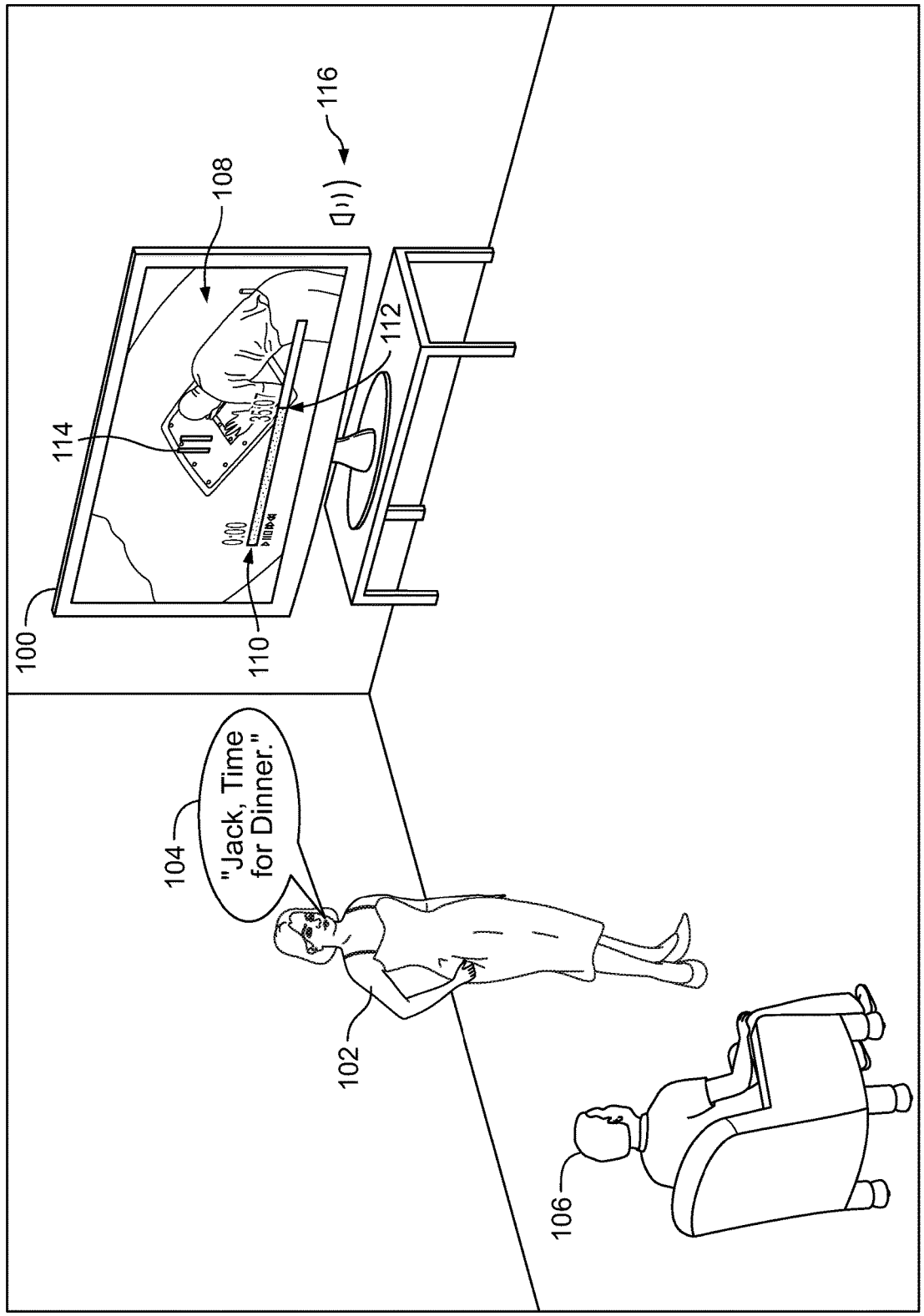
FIG. 1 shows an illustrative embodiment of translating an irrelevant command into a pertinent playback modification to encourage a recipient of the command to execute on the command, in accordance with some embodiments of the disclosure.

FIG. 1 shows an illustrative embodiment of translating an irrelevant command into a pertinent playback modification to encourage a recipient of the command to execute on the command, in accordance with some embodiments of the disclosure. FIG. 1 depicts illustrative display 100, which may be presented by control circuitry that executes a media guidance application on any user equipment. The functionality of user equipment, control circuitry, and the media guidance application is described in further detail with respects to FIGS. 2-5.

The media guidance application may detect that first user 102 has issued command 104. Command 104 may be a verbal input of a word or phrase. The media guidance application may detect that command 104 is directed towards second user 106 (e.g., first user 102 may say "Time for dinner!" to second user 106). The media guidance application may be playing back media asset 108. The media guidance application may generate for display trick play bar 110 over media asset 108; trick play bar 110 may contain all trick play functionalities (e.g., play, pause, stop, rewind, fast-forward, etc.). The media guidance application may, within trick play bar 110, generate for display indicator 112, which may correspond to the current location of playback of media asset 108. The media guidance application may determine that command 114 corresponds to a trick play bar command (e.g., play, pause, stop, rewind, fast-forward, volume up, volume down, on/off, etc.) applied to the media asset (e.g., the media asset is paused). The media guidance application may determine that volume 116 may correspond to the current volume of playback of media asset 108. The media guidance application may modify volume 116 in response to command 114.

In some embodiments, a media guidance application may detect a command from a first user to a second user. The first user may be a user not currently watching playback of a media asset, and may be in an environment outside of the viewing environment of the media asset. The second user may be a user currently viewing playback of media asset 108 within the viewing environment of the media asset. For example, the media guidance application may detect a verbal command (e.g., "Come to the table for dinner!") from the first user to the second user using a home entertainment system (e.g., an Amazon Echo).

In some embodiments, when the media guidance application detects the command from the first user to the second user, the media guidance application may detect a verbal input from the first user. The verbal input may be a spoken word or phrase from the first user that corresponds to a command. For example, the media guidance application may detect, using an audio detection sensor (e.g., a microphone), a verbal input (e.g., the user saying, "Dinner's ready!") from the first user. The media guidance application may compare an audio signal detected by the sensor (e.g., the microphone) to known audio samples from the first user, retrieved from a profile of the first user, to determine that the audio signal is verbal input from the first user.

As another example, the media guidance application may detect a verbal input from the first user using an intelligent personal assistant (IPA) (e.g., an Amazon Echo, Siri, etc.), where the IPA constantly listens for audio inputs in an environment around the IPA to detect verbal input from the user.

The media guidance application may compare the verbal input to a database of commands, where the database contains commands corresponding to each verbal input. The media guidance application may retrieve the database of commands from the profile of the first user. For example, the media guidance application may retrieve the database of commands from the profile for the first user and compare the verbal input (e.g., the user saying, "Dinner's ready!") to a database containing commands (e.g., eat dinner, answer the door, clean, vacuum, etc.).

The media guidance application may determine, from the comparison, a command corresponding to the verbal input from the first user. For example, the media guidance application may determine, from the user profile, that the verbal input (e.g., "Dinner's ready!") corresponds to the command (e.g., eat dinner) using pattern recognition between the input and the command.

In some embodiments, when the media guidance application determines from the comparison a command corresponding to the verbal input from the first user, the media guidance application may determine a match between the verbal input and the database of commands. The media guidance application may determine potential matches between the verbal input and the database of commands through keyword matching. For example, the media guidance application may detect keywords in the verbal input (e.g., "dinner" and "ready") and may compare these keywords to the database of commands. Each command in the database of commands may have a plurality of keywords associated with it (e.g., the command "eat dinner" may have the keywords "dinner," "food," "hungry," "eat," "eating," etc. associated with it). The media guidance application may determine that the verbal input matches a command when a single or multiple keywords from the verbal input match a single or multiple keywords associated with a command in the database of commands.

For example, the media guidance application may determine that the verbal input (e.g., "Dinner's ready!") corresponds to the command (e.g., eat dinner) because the verbal input matches keywords contained in the command (e.g., "dinner"). The media guidance application may determine that the command corresponding to the match (e.g., eat dinner) is the command corresponding to the verbal input from the first user.

In some embodiments, when the media guidance application determines multiple potential matches between the verbal input and the database of commands (e.g., the verbal input may match multiple different commands), the media guidance application may determine that a command corresponding to a match within the potential matches that contains the most keyword matches is the command corresponding to the verbal input from the first user. For example, when the media guidance application determines that the verbal input (e.g., "Time to eat dinner!") matches multiple commands (e.g., eat dinner, eat lunch, set timer etc.), the media guidance application may determine that the match (e.g., eat dinner) contains the most keyword matches and thus is the command corresponding to the verbal input.

After determining the command given by the first user, the media guidance application may determine the context of the command and how it relates to a playback operation. The media guidance application may compare the command to a set of playback operation commands for a media asset that is currently being played back by the second user. The media guidance application may retrieve the set of playback operation commands from a database in the profile. For example, the media guidance application may compare the command (e.g., eat dinner) to a set of playback operation commands (e.g., pause, fast-forward, mute, etc.), retrieved from the profile, for a media asset (e.g., a movie) that is currently being played back by the second user.

In response to the comparison, the media guidance application may determine that the command is not contained within the set of playback operation commands. For example, the media guidance application may determine that the command (e.g., eat dinner) is not contained within the set of playback operation commands (e.g., pause, fast-forward, mute, etc.).

The media guidance application may determine, based on a user profile of the first user and a user profile of the second user, a desired outcome of the command from a plurality of outcomes of the command. The media guidance application may use attributes to determine the desired outcome, as described in detail below. For example, the media guidance application may determine a desired outcome of the command (e.g., the second user stops watching the movie and eats dinner) based on a user profile of the first user (e.g., the profile may state that the first user is a mom) and a user profile of the second user (e.g., the second profile may state that the second user is the mom's son who obeys the mom's commands), using the methods described below.

In some embodiments, the media guidance application may determine the desired outcome of the command by determining attributes of the command. In some embodiments, when the media guidance application is determining, based on the user profile of the first user and the user profile of the second user, the desired outcome of the command from the plurality of outcomes of the command, the media guidance application may determine attributes of the command. The media guidance application may analyze the command to determine distinct attributes (e.g., the prosody (e.g., using the tune and rhythm of speech to determine the meaning) of the command).

In some embodiments, the media guidance application may analyze the audio characteristics of the command to determine distinct attributes. In some embodiments, to determine distinct attributes, the media guidance application may compare the command with an audio sample in a plurality of audio samples, where each audio sample is associated with a distinct user, to determine the user speaking the command. The media guidance application may determine, using speech processing, the following attributes, including the form of the utterance (e.g., statement, question, or command), the presence of sarcasm or irony, emphasis, contrast, focus, and presence of infant-directed speech (e.g., baby talk) using speech processing variables such as the pitch of the voice (e.g., varying between low and high), the length of sounds (e.g., varying between short and long), the loudness (e.g., varying between soft and loud), and the timbre of the sound. For example, the media guidance application may determine attributes of the command (e.g., the speaker of the command, the tone of the command, seriousness of the command, etc.) using speech processing with pitch, length of sounds, loudness, and timbre speech processing variables corresponding to the command. In response to determining distinct attributes of the command, the media guidance application may compare the attributes of the command to attributes of the plurality of outcomes of the command to determine a desired outcome.

The media guidance application may compare the attributes of the command to attributes of the plurality of outcomes of the command. For example, the media guidance application may compare the attributes of the command (e.g., form of utterance, presence of sarcasm or irony, emphasis, contrast, focus, infant-direct speech, etc.) to attributes of the plurality of outcomes of the command (e.g., a result if the command is followed, a result if the command is ignored, a consequence of following the command, a consequence of not following the command, etc.). The media guidance application may retrieve the plurality of outcomes from a database in the profile.

In some embodiments, the media guidance application may retrieve a plurality of outcomes of the command from the profile. The media guidance application may determine that each command in the database of commands is linked to a set of corresponding outcomes to said command. For example, the media guidance application may use a pointer from the command entry in the database to the set of corresponding outcomes. The corresponding outcomes to the said command may be predetermined by an editor, and may also be updated and added to by the media guidance application based on learned behaviors of the users.

In some embodiments, the media guidance application may add an outcome to be linked to a command based on learned behavior. The media guidance application may determine that a new outcome that occurred between the first and second user after a command was issued was not included in the set of corresponding outcomes to said command by comparing the new outcome to the set of corresponding outcomes, and determining that there is no overlap between the two pieces of data. For example, the media guidance application may determine from the comparison that a new outcome (e.g., the second user answers his/her phone in response to the command) does not overlap the current set of corresponding outcomes (e.g., eat, pause the movie, do nothing).

The media guidance application may retrieve attributes of an outcome in the plurality of outcomes from an attribute database in the profile.

In some embodiments, the media guidance application may retrieve attributes of an outcome from an attribute database that contains preset attributes, determined by an editor, that correspond to an outcome. The media guidance application may update the attribute database in response to determining a new attribute that corresponds to an outcome, or to remove an attribute that corresponds to an outcome (e.g., no longer is an accurate attribute of the outcome), as described in detail below. Each attribute may have a pointer in the database that is directed to the corresponding outcome. For example, the media guidance application may retrieve attributes (e.g., user goes to dinner, user goes to the dining room, user eats food from plate on dinner table, user pauses playback and leaves room to go to the dining room, etc.) corresponding to the outcome (e.g., eat dinner).

The media guidance application may determine that a new attribute corresponds to an outcome by determining that the outcome has occurred (e.g., detecting it using a sensor), and analyzing the occurred outcome to determine attributes of the outcome. The media guidance application may determine attributes of the outcome based on the physical and auditory components of the outcome. The media guidance application may determine the attributes based on the auditory components of the occurred outcome using methods similar to those described above in relation to determining attributes of the command (e.g., by determining the prosody of the command).

In some embodiments, the media guidance application may determine attributes of the outcome based on physical components of the occurred outcome. The media guidance application may detect a physical response corresponding to the outcome using a sensor. For example, the media guidance application may use a camera to detect the second user physically leaving the viewing environment of the playback of the media asset. As another example, the media guidance application may use an infrared sensor to determine a heat map of the viewing environment, to detect that the second user has not moved from his/her position in the viewing environment in response to hearing the command from the first user. The media guidance application may determine that the detected physical response is an attribute of the occurred outcome. The media guidance application may compare the determined attributes of the occurred outcome to the attributes in the database corresponding to the outcome, and may add any attributes from the occurred outcome that were not in the attributes corresponding to the outcome.

For example, the media guidance application may determine, from detecting via a camera, that an outcome (e.g., the second user leaving the viewing environment of the media asset) has occurred. The media guidance application may analyze the occurred outcome (e.g., the second user yelled out to the first user "I'm not hungry!") to determine attributes of the outcome (e.g., based on the auditory and physical components of the occurred outcome). The media guidance application may determine that the user's negative response (e.g., based on the user yelling and the context of the user's response) and the user's failure to leave the viewing area are attributes of the occurred outcome (e.g., the user does not follow the command).

In some embodiments, the media guidance application may remove an attribute that corresponds to an outcome in response to determining that the attribute has not been present in a corresponding outcome after the same outcome has occurred at least a threshold amount of times. The media guidance application may keep a counter in a plurality of counters, where each counter is associated with an attribute for a specific outcome. The media guidance application may update the counter (e.g., add a value to the counter) for an attribute for a specific outcome after the specific outcome has occurred and contained the attribute. The media guidance application may retrieve the threshold amount of times from the profile, and the threshold value may be preset by an editor, and may be updated based on user input. The media guidance application may compare the counter for the specific outcome to the threshold value, and in response to determining that the counter is greater than the threshold value, the media guidance application may remove the attribute as an attribute that corresponds to the outcome.

For example, the media guidance application may remove an attribute (e.g., the second user yells "No" in response to the command) that corresponds to an outcome (e.g., the second user does not eat dinner). The media guidance application may determine that the attribute has not been present in a corresponding outcome after the same outcome has occurred at least a threshold amount of time (e.g., 10 times). The media guidance application may retrieve an editor-defined threshold amount of times from the profile (e.g., 10 times). The media guidance application may compare the editor-defined threshold amount of times with a counter associated with the outcome, and in response to determining that the counter (e.g., 11 times) is greater than the threshold amount (e.g., 10 times), the media guidance application may remove the attribute (e.g., the second user yells "No" in response to the command) that corresponds to an outcome (e.g., the second user does not eat dinner).

The media guidance application may determine, from the comparison, an outcome in the plurality of outcomes that contains attributes of the command to be the desired outcome. The media guidance application may use a ranking system to determine, from the comparison, the desired outcome. For example, the media guidance application may determine, from the comparison, an outcome (e.g., the user pauses the movie to go eat dinner) that contains attributes of the command (e.g., an intended consequence of the command) to be the desired outcome.

In some embodiments, the media guidance application may determine the outcome in the plurality of outcomes that contains attributes of the command to be the desired outcome based on a rank of the outcome in the plurality of outcomes. The media guidance application may determine a rank of an outcome of a plurality of outcomes based on the amount of attributes that the outcome has in common with the attributes of the command (e.g., a percentage of attributes in common). The media guidance application may determine that rank directly corresponds with the percentage of attributes in common (e.g., the rank is higher when the percentage is higher).

For example, the media guidance application may determine a rank of an outcome in a plurality of outcomes by determining that the outcome has a percentage of attributes (e.g., 18 out of 20 attributes, or 90%) in common with the attributes of the command (e.g., by comparing the attributes of the outcome with the attributes of the command). The media guidance application may determine that the rank of the outcome directly corresponds with the percentage (e.g., ranked 90 out of 100).

In some embodiments, the media guidance application may retrieve, from the preferences of the first user (e.g., the first user has a preferred outcome for a specific command), an outcome corresponding to the first user's preferred outcome. The preferred outcome for the specific command may cause the outcome in the plurality of outcomes corresponding to the preferred outcome to be the highest ranked outcome. For example, the media guidance application may retrieve an outcome (e.g., the second user gets up to go eat dinner) corresponding to the first user's preferred outcome from the preferences of the first user. The media guidance application may determine that the preferred outcome ranks the highest out of all the plurality of outcomes (e.g., ranks 100 out of 100).

After determining the desired outcome of the command, the media guidance application may determine the second user's reaction to the command to determine whether it meets the desired outcome. The media guidance application may detect an action executed by the second user. For example, the media guidance application may detect via a camera that the user has left the viewing environment where playback of the movie is occurring and has entered the dining room.

In some embodiments, when the media guidance application is detecting an action executed by the second user, the media guidance application may detect using a sensor, the second user leaving a viewing environment of a media equipment device that is presenting the media asset. For example, the media guidance application may detect via a motion detection sensor that the second user is leaving the viewing environment of the television the user is watching a movie on.

In some embodiments, when the media guidance application is detecting an action executed by the second user, the media guidance application may detect, the second user executing a command to modify playback of the media asset. For example, the media guidance application may detect the user pressing an input command on a remote control device to "pause" playback of the film the user is watching.

In some embodiments, when the media guidance application is detecting an action executed by the second user, the media guidance application may detect, using a sensor, that the second user stays in the viewing environment of a media asset device. For example, the media guidance application may detect using a heat-mapping sensor that the second user has not left the couch where the user is watching playback of the movie.

The media guidance application may compare the action of the second user to the desired outcome of the command. For example, the media guidance application may compare the action (e.g., the second user continuing to watch the movie) to the desired outcome of the command (e.g., the second user going to eat dinner).

In response to determining that the action of the second user does not correspond to the desired outcome of the command, the media guidance application may retrieve characteristics of the second user from the user profile of the second user. The media guidance application may retrieve characteristics of the second user from a characteristics database in the user profile. The characteristics values stored in the database may be determined based on user input (e.g., the user inputting information via a user input device, such as a remote controller). For example, the media guidance application may retrieve characteristics (e.g., age, relationship to the first user, user rank within household, etc.) from the user profile of the second user.

In some embodiments, the media guidance application may compare a characteristic from the retrieved characteristics of the second user to the command, where the characteristic is selected from a group of characteristics consisting of age, rank, relationship to other users, and time of day, and the command is selected from a group of commands consisting of, eating, cleaning, studying, cooking, and sleeping.

The media guidance application may determine, from the comparison, whether the command shares a characteristic of the second user. For example, the media guidance application may determine, from the comparison, whether the command (e.g., eating) shares a characteristic of the second user (e.g., time of day).

In some embodiments, the media guidance application may determine whether the command shares the "age" characteristic of the second user. The media guidance application may retrieve, from the profile, the age characteristics of the command. For example, the media guidance application may retrieve the age characteristics of the command (e.g., this command must be obeyed by any users under the age of 15, and may be ignored by any users over the age of 15). The media guidance application may compare the age (e.g., the second user is 10 years old) of the second user to the age characteristics of the command, and may determine that the command shares the age characteristic of the second user (e.g., the second user's age is within the age range (15 and under) of users that must obey the command).

In some embodiments, the media guidance application may determine whether the command shares the "relationship to other users" characteristic of the second user. The media guidance application may retrieve the second user's relationship to the other users (e.g., the second user is the son of the first user) from the profile. The media guidance application may retrieve the relationship characteristic of the command (e.g., a hierarchy of who must obey commands based on the relationship of the user giving the command to the user receiving the command). The media guidance application may determine, based on the hierarchy, whether the second user has to obey the first user's commands. In response to determining that "yes," the second user has to obey the first user's commands, the media guidance application may determine that the command shares the "relationship to other users" characteristic with the second user.

In some embodiments, the media guidance application may determine whether the command shares the "time of day" characteristic of the second user. The media guidance application may retrieve the "time of day" characteristic (e.g., the user obeys commands from the first user between 5:00 pm-8:00 pm every day) from the profile of the second user. The time of day characteristic may be a predetermined value created from an input from the first user into the profile of the second user. The media guidance application may determine the time of day that the command was issued by the first user (e.g., 7:02 pm). The media guidance application may compare this time to the time of day characteristic, and determine that the command shares the time of day characteristic with the second user because the time the command was issued falls within the timeframe from the time of day characteristic.

In some embodiments, when the media guidance application is determining whether to modify playback of the media asset based on the command detected from the first user and the retrieved characteristics of the second user, the media guidance application may retrieve a rank of the first user and a rank of the second user. The media guidance application may retrieve the ranks of the first user and second user from the profiles, where the ranks are preset values based on user input (e.g., the first user selects the ranking order of all the users with user accounts). For example, the media guidance application may retrieve a rank of the first user (e.g., the first user is ranked first out of five users) and a rank of the second user (e.g., the second user is ranked fourth out of five users).

The media guidance application may determine, from the rank, whether the first user is ranked higher than the second user. For example, the media guidance application may determine that the first user (e.g., ranked first) is ranked higher than the second user (e.g., ranked second).

In response to determining that the first user is ranked higher than the second user, the media guidance application may modify playback of the media asset. For example, in response to determining that the first user is ranked higher than the second user, the media guidance application may modify playback of the media asset (e.g., pause the movie currently playing back).

In response to determining that the second user is ranked higher than the first user, the media guidance application may continue to play back the media asset. For example, in response to determining that the second user is ranked higher than the first user, the media guidance application may continue playback of the media asset (e.g., the movie the second user is watching).

In response to determining that the command shares the characteristic, the media guidance application may modify playback of the media asset. For example, in response to determining that the command shares the characteristic, the media guidance application may modify playback of the media asset (e.g., pause playback of the media asset).

The media guidance application may determine the specific type of playback modification (e.g., pause, mute, rewind, fast-forward, turn off, etc.) based on preferences for the first user. The media guidance application may retrieve the first user's preferences from a playback modification database in the profile the first user. The media guidance application may retrieve a playback modification from the database that corresponds to the command. The playback modifications corresponding to each command may be preset by an editor, or by input from the first user.

For example, the media guidance application may determine the specific type of playback modification based on preferences of the first user. The media guidance application may retrieve the first user's preferences from a playback modification database in the profile of the first user. The media guidance application may retrieve a playback modification (e.g., turn off playback of the media asset) from the database that corresponds to the command (e.g., eat dinner).

In some embodiments, the media guidance application may detect a command from the first user to the second user and a third user. For example, the media guidance application may detect a command (e.g., eat dinner) from the first user to the second user and a third user. The media guidance application may detect a command using similar methods as described above.

The media guidance application may determine, based on the user profile of the first user, the user profile of the second user and a user profile of the third user, a desired outcome of the command from a plurality of outcomes of the command. The media guidance application may determine the desired outcome of the command using similar methods as described above.

The media guidance application may detect a first action executed by the second user and a second action executed by the third user. For example, the media guidance application may detect a first action by the second user (e.g., the second user turns up the volume of the movie) and a second action executed by the third user (e.g., a motion sensor may detect that the third user leaves the viewing environment to go eat dinner). The media guidance application may detect the first action executed by the second user and the second action executed by the third user using similar methods to detect actions as described above.

The media guidance application may compare the action of the second user and the action of the third user to determine the desired outcome of the command. For example, the media guidance application may compare the action of the second user (e.g., turning up the volume of the movie via a remote) and the action of the third user (e.g., a motion sensor detecting the third user leaving the viewing environment) to the desired outcome of the command (e.g., the second and third users going to eat dinner).

In response to determining that the action of the second user and the action of the third user do not correspond to the desired outcome of the command, the media guidance application may retrieve characteristics of the second user from the user profile of the second user and characteristics of the third user from a user profile of the third user.

The media guidance application may determine whether to modify playback of the media asset based on the command detected from the first user and the retrieved characteristics of the second user and the retrieved characteristics of the third user. For example, the media guidance application may determine to modify playback of the media asset based on the command detected from the first user (e.g., eat dinner) and the retrieved characteristics of the first user (e.g., rank, etc.) and the retrieved characteristics of the third user (e.g., rank, etc.) because the command outranks the ranks of the second and third user. As another example, the media guidance application may determine not to modify playback of the media asset based on the command detected from the first user (e.g., eat dinner) and the retrieved characteristics of the first user (e.g., rank, etc.) and the retrieved characteristics of the third user (e.g., rank, etc.) because the ranks of the second and third user outrank the rank of the command and first user.

As yet another example, the media guidance application may determine to partially modify play back (e.g., mute the audio of the playback, but playback the audio via Bluetooth headphones for user three) of the media asset based on the command detected from the first user (e.g., eat dinner) and the retrieved characteristics of the first user (e.g., rank, etc.) and the retrieved characteristics of the third user (e.g., rank, etc.) because the rank of only the third user outranks the rank of the command and first user.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 2:
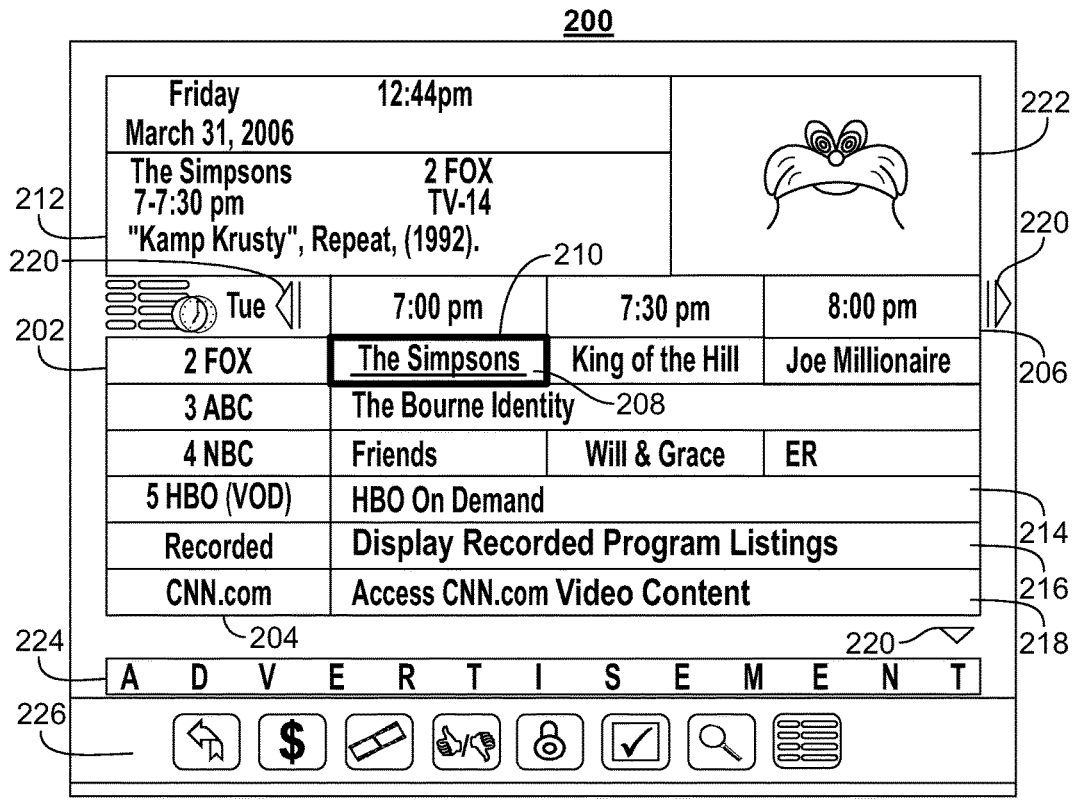
FIG. 2 shows an illustrative embodiment of a display screen that may be used to provide media guidance application listings and other media guidance information, in accordance with some embodiments of the disclosure.
Figure 3:
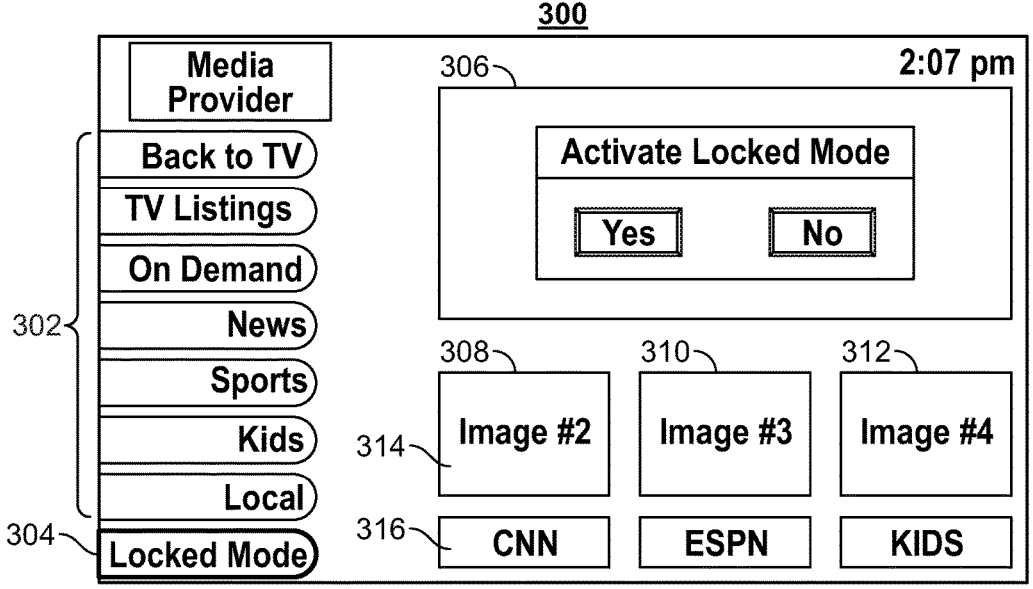
FIG. 3 shows another illustrative embodiment of a display screen that may be used to provide media guidance application listings, in accordance with some embodiments of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
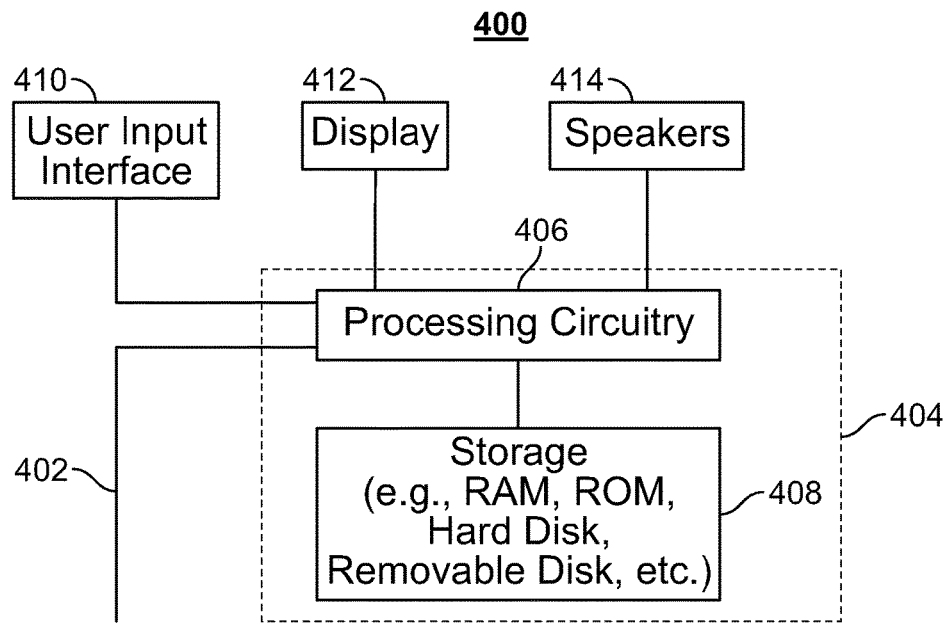
FIG. 4 is a block diagram of an illustrative user equipment (UE) device, in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
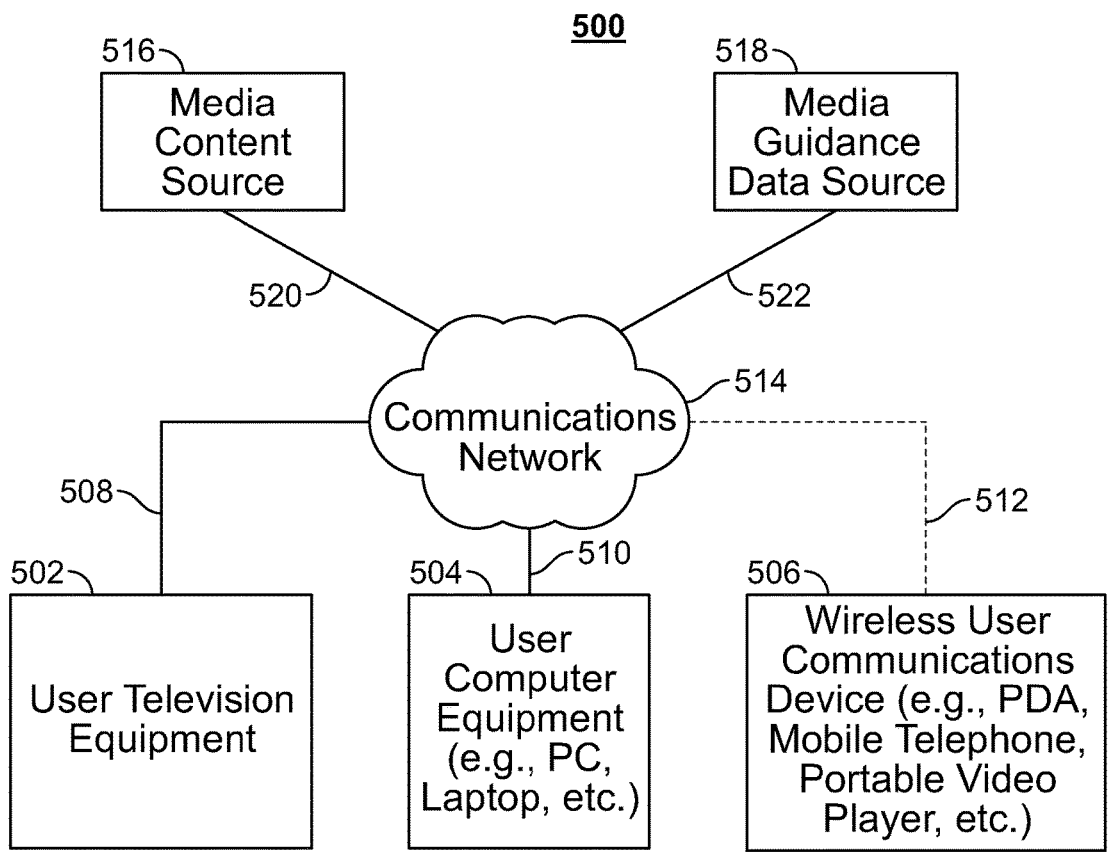
FIG. 5 is a block diagram of an illustrative media system, in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 6:
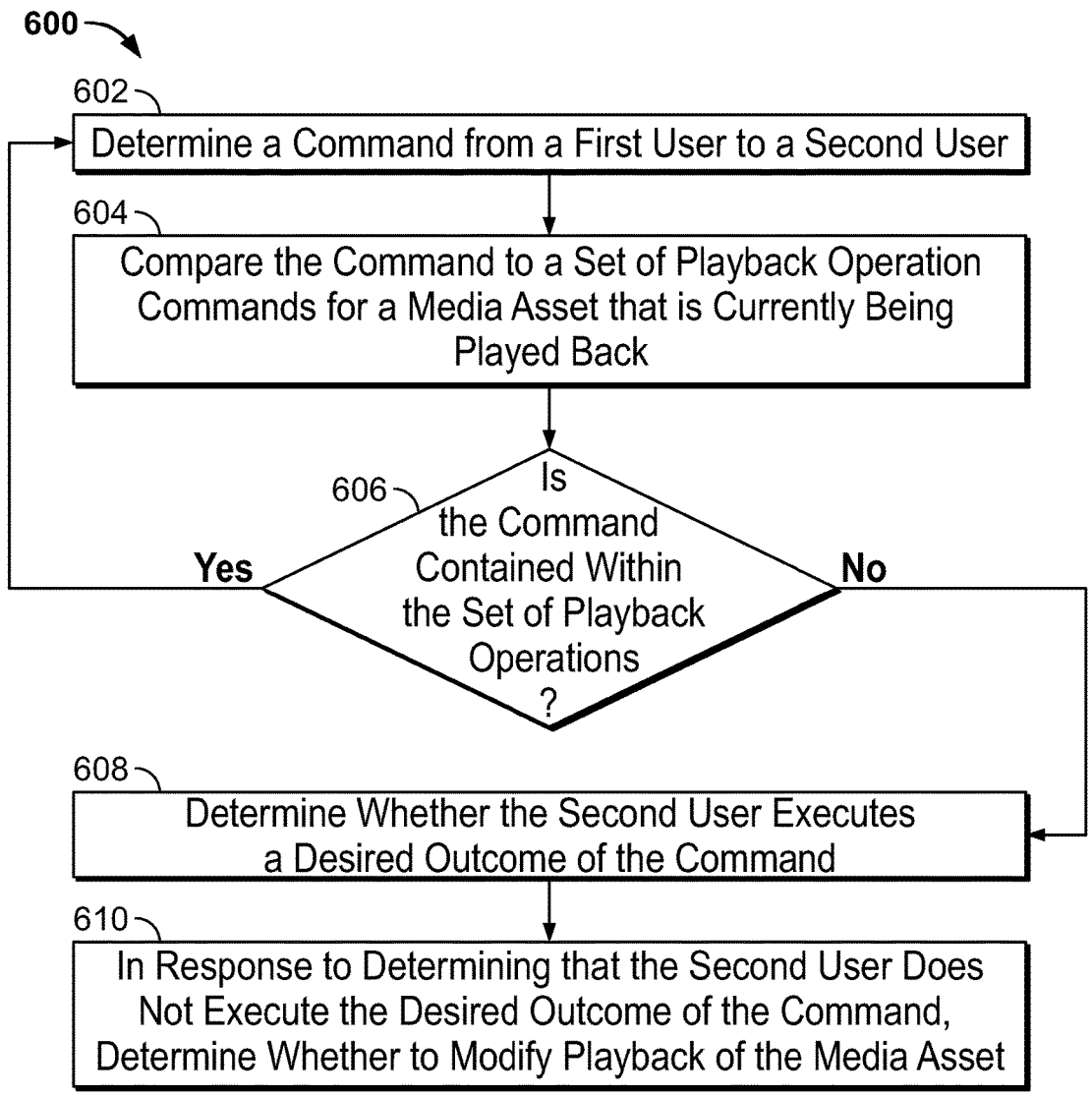
FIG. 6 depicts an illustrative flowchart of a process for translating a non-playback command into a pertinent playback modification to encourage a recipient of the command to execute on the command, in accordance with some embodiments of the disclosure.

FIG. 6 depicts an illustrative flowchart of a process for translating a non-playback command into a pertinent playback modification to encourage a recipient of the command to execute on the command, in accordance with some embodiments of the disclosure. Process 600, and any of the following processes, may be executed by control circuitry 404 (e.g., in a manner instructed to control circuitry 404 by the media guidance application). Control circuitry 404 may be part of user equipment (e.g., user equipment 100, which may have any or all of the functionality of user television equipment 502, user computer equipment 504, and/or wireless communications device 506), or of a remote server separated from the user equipment by way of communication network 514, or distributed over a combination of both.

Process 600 begins at 602, where control circuitry 404 determines a command from first user 102 to second user 106. Control circuitry 404 determines the command from first user 102 to second user 106 by detecting audio output 104 from first user 102 using a sensor, user television equipment 502, user computer equipment 504, and/or wireless user communications device 512. For example, control circuitry 404 may determine a command (e.g., eat dinner) from first user 102 to second user 104 by detecting a verbal output (e.g., "Time for dinner!") from first user 102 using an audio sensor.

At 604, control circuitry 404 compares the command to a set of playback operation commands for a media asset that is currently being played back. Control circuitry 404 retrieves a set of playback operation commands for the media asset from storage 408 or over communications network 514. Control circuitry 404 compares the command to the retrieved set of playback operations using processing circuitry 406. For example, control circuitry 404 compares the command (e.g., "eat dinner") to a set of playback operation commands (e.g., pause, play, rewind, fast-forward, stop, mute, etc.) for the media asset currently being played back.

At 606, control circuitry 404 determines whether the command is contained within the set of playback operations. If, at 606, control circuitry 404 determines that "Yes," the command is contained within the set of playback operations, then process 606 reverts to process 602.

If, at 606, control circuitry 404 determines that "No," the command is not contained within the set of playback operations, then process 606 continues to process 608. At 608, control circuitry 404 determines whether second user 106 executes a desired outcome of the command. Control circuitry 404 determines whether second user 106 executes a command using similar methods as described above. For example, control circuitry 404 may use wireless user communications device 506 to detect an action that second user 106 executes (e.g., tracking the user's phone to determine whether the user leaves the viewing environment).

At 610, in response to determining that the second user does not execute the desired outcome of the command, control circuitry 404 determines whether to modify playback of the media asset. For example, control circuitry 404 may retrieve a rank of each of the users stored in storage 408 or retrieved via communications network 514. Control circuitry 404 may determine whether first user 102 ranks higher than second user 106, and in response to determining that first user 102 ranks higher than second user 106, control circuitry 404 may modify playback of the media asset. For example, the media guidance application may mute volume of playback of the media asset 116 through speakers 414. As another example, the media guidance application may turn off display 412.

Figure 7:
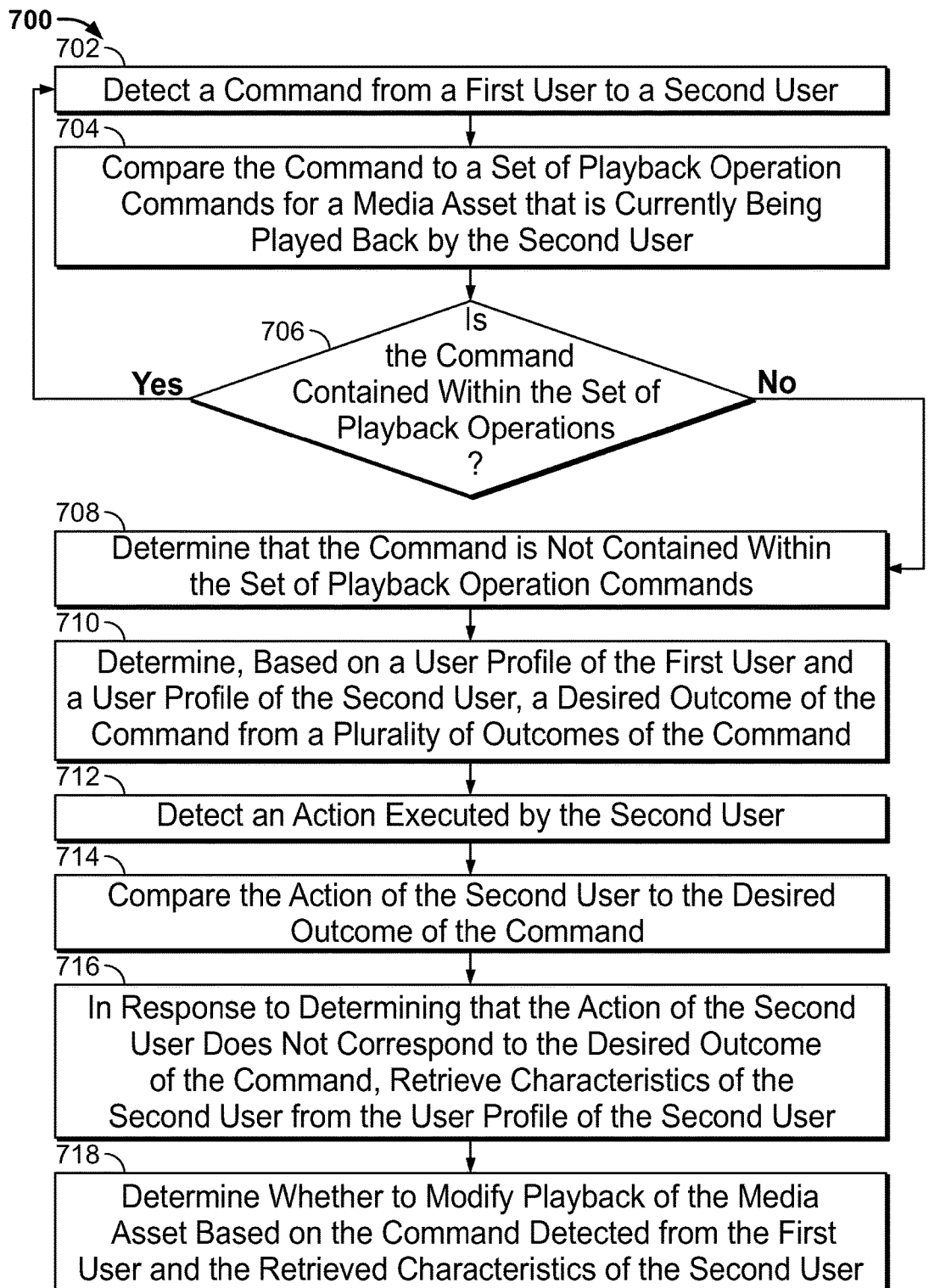
FIG. 7 depicts another illustrative flowchart of a process for translating a non-playback command into a pertinent playback modification to encourage a recipient of the command to execute on the command, in accordance with some embodiments of the disclosure.

FIG. 7 depicts an illustrative flowchart of a process for translating a non-playback command into a pertinent playback modification to encourage a recipient of the command to execute on the command, in accordance with some embodiments of the disclosure. Process 700 begins at 702, where control circuitry 404 detects a command from first user 104 to second user 106. Control circuitry 404 detects the command from first user 104 to second user 106 by detecting audio output 104 from first user 104 using a sensor, user television equipment 502, user computer equipment 504, and/or wireless user communications device 512. For example, control circuitry 404 may detect a command from a first user to a second user by detecting a verbal output from the first user using an audio sensor.

At 704, control circuitry 404 compares the command to a set of playback operation commands for a media asset that is currently being played back by second user 106. Control circuitry 404 retrieves a set of playback operation commands for media asset 108 from storage 408 or media guidance data source 518, or via communications network 514. Control circuitry 404 compares the command to the retrieved set of playback operations using processing circuitry 406. For example, control circuitry 404 may retrieve a set of playback operation commands (e.g., pause, play, rewind, fast-forward, stop, etc.) from a database in storage 408. Control circuitry 404 may compare the command to the set of retrieved playback operation commands.

At 706, control circuitry 404 determines whether the command is contained within the set of playback operations. If, at 706, control circuitry 404 determines that "Yes," the command is contained within the set of playback operations, process 706 reverts to process 702.

If, at 706, control circuitry 404 determines that "No," the command is not contained within the set of playback operations, process 706 proceeds to process 708. At 708, control circuitry 404 determines that the command is not contained within the set of playback operation commands. For example, control circuitry 404 may determine, using processing circuitry 406, that the command (e.g., eat dinner) is not contained within the set of playback operation commands (e.g., pause, play, stop, rewind, fast-forward, etc.).

At 710, control circuitry 404 determines, based on a user profile of first user 102 and a user profile of second user 106, a desired outcome of the command from a plurality of outcomes of the command. Control circuitry 404 retrieves the user profile of first user 102 and the user profile of second user 106 from storage 408 or media guidance data source 518, or via communications network 514. Control circuitry 404 determines the desired outcome of the command using similar methods as described above.

At 712, control circuitry 404 detects an action executed by second user 106. Control circuitry 404 determines the action second user 106 executes using similar methods as described above. For example, control circuitry 404 may use wireless user communications device 506 (e.g., a camera) to detect an action that the second user executes (e.g., tracking the user's movements to determine whether the user leaves the viewing environment). At 714, control circuitry 404 compares the action of second user 106 to the desired outcome of the command. Control circuitry 404 compares the action of the second user to the desired outcome of the command using similar methods as described above. For example, control circuitry 404 may compare the action (e.g., the user not moving from the couch) to the desired outcome (e.g., the user going to eat dinner).

At 716, in response to determining that the action of second user 106 does not correspond to the desired outcome of the command, control circuitry 404 retrieves characteristics of second user 106 from the user profile of second user 106. Control circuitry 404 retrieves characteristics of the second user from a database in storage 408 corresponding to the user profile or via communications network 514. For example, control circuitry 404 retrieves characteristics of the second user (e.g., the second user is 10 years old) from a database in storage 408 corresponding to the second user's profile. At 718, control circuitry 404 determines whether to modify playback of the media asset based on the command detected from first user 102 and the retrieved characteristics of second user 106. Control circuitry 404 may determine whether to modify playback of the media asset based on the command and the retrieved characteristics using similar methods as described above. For example, control circuitry 404 may determine whether to modify playback of the media asset based on the ranking between the two users, as retrieved from a database corresponding to the user profiles in storage 408.

Figure 8:
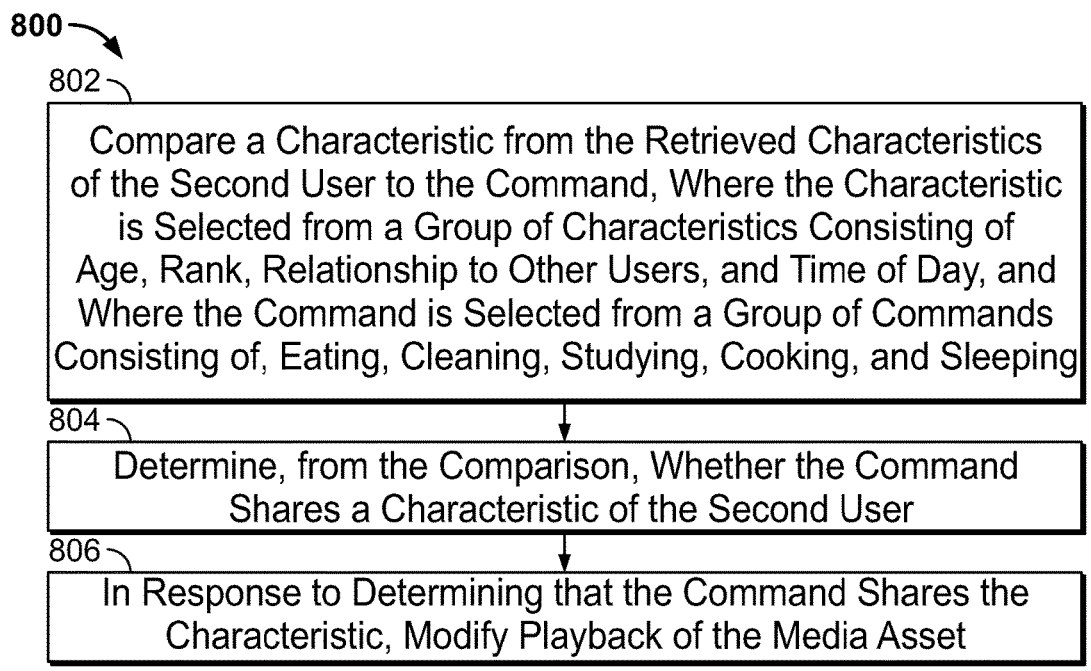
FIG. 8 depicts an illustrative flowchart of a process for determining a command based on a characteristic of the second user, in accordance with some embodiments of the disclosure.

FIG. 8 depicts an illustrative flowchart of a process for determining a command based on a characteristic of second user 106, in accordance with some embodiments of the disclosure. Process 800 begins at 802, where control circuitry 404 compares a characteristic from the retrieved characteristics of the second user to the command, where the characteristic is selected from a group of characteristics consisting of age, rank, relationship to other users, and time of day, and where the command is selected from a group of commands consisting of, eating, cleaning, studying, cooking, and sleeping. Control circuitry 404 retrieves the characteristics from a database in storage 408. Control circuitry 404 compares the characteristic to the command using similar methods as described above. For example, control circuitry 404 may compare a characteristic (e.g., age) from the retrieved characteristics to the command (e.g., eating).

At 804, control circuitry 404 determines, from the comparison, whether the command shares a characteristic of second user 106. Control circuitry 404 retrieves characteristics of the command from a database in storage 408 to use in the comparison. For example, control circuitry 404 may determine, using processing circuitry 406, that the command (e.g., eating) shares a characteristic (e.g., the time of day corresponds to dinner time) of second user 106. At 806, in response to determining that the command shares the characteristic, control circuitry 404 modifies playback of the media asset. For example, control circuitry 404 may pause playback of the media asset on user television equipment 502. As another example, the control circuitry 404 may mute the sound of the playback of the media asset (e.g., volume 116) through speakers 414. As yet another example, control circuitry 404 may power off display 412 that was displaying playback of the media asset.

Figure 9:
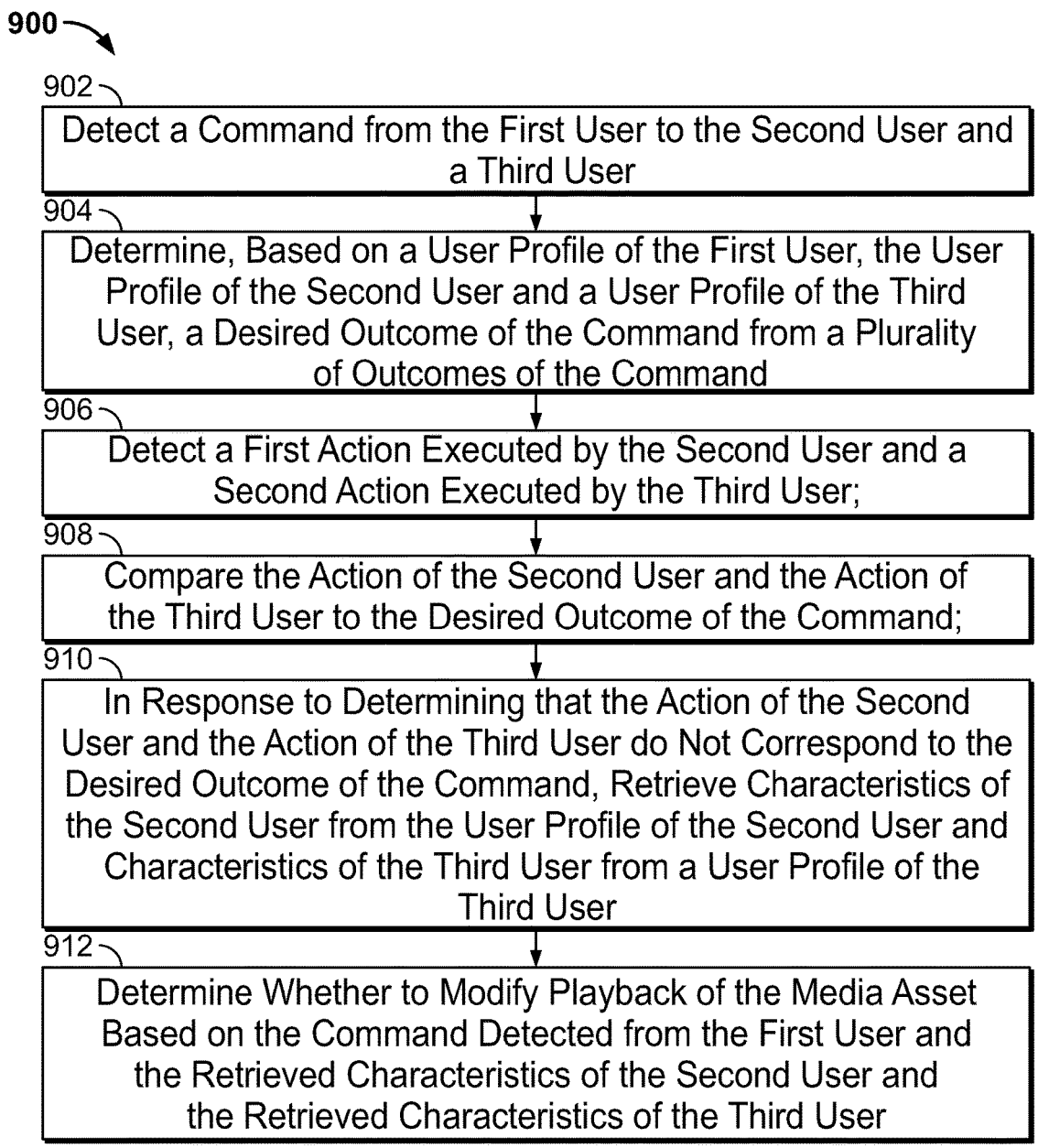
FIG. 9 depicts an illustrative flowchart of a process for translating a non-playback command into a pertinent playback modification to encourage a recipient of the command to execute on the command, in accordance with some embodiments of the disclosure.

FIG. 9 depicts an illustrative flowchart of a process for translating a non-playback command into a pertinent playback modification to encourage a recipient of the command to execute on the command, in accordance with some embodiments of the disclosure. Process 900 begins at 902, where control circuitry 404 detects a command from first user 102 to second user 106 and a third user. For example, control circuitry 404 may detect a command from a first user to the second user and a third user by detecting a verbal output from the first user using an audio sensor.

At 904, control circuitry 404 determines, based on a user profile of first user 102, the user profile of second user 106 and a user profile of the third user, a desired outcome of the command from a plurality of outcomes of the command. For example, control circuitry 404 may determine a desired outcome of the command based on retrieving attributes of the command from a database in storage 408 or media guidance data source 518, or via communications network 514.

At 906, control circuitry 404 detects a first action executed by the second user and a second action executed by the third user. Control circuitry 404 determines the action that the second user executes and the action that the third user executes using similar methods as described above. For example, control circuitry 404 may use wireless user communications device 506 (e.g., a camera) to detect the actions that the second user and third user execute (e.g., tracking the user's movements to determine whether the user leaves the viewing environment).

At 908, control circuitry 404 compares the action of second user 106 and the action of the third user to the desired outcome of the command. For example, control circuitry 404 may compare the action of second user 106 (e.g., still watching the media asset) and the action of the third user (e.g., still watching the media asset) to the desired outcome of the command (e.g., walking to the dinner table).

At 910, in response to determining that the action of the second user and the action of the third user do not correspond to the desired outcome of the command, control circuitry 404 retrieves characteristics of second user 106 from the user profile of second user 106 and characteristics of the third user from a user profile of the third user. For example, control circuitry 404 may retrieve characteristics of the second user from a database in storage 408 corresponding to the second user's profile, and may retrieve characteristics of the third user from a profile of the third user stored on a remote server via communications network 514.

At 912, control circuitry 404 determines whether to modify playback of the media asset based on the command detected from first user 102 and the retrieved characteristics of second user 106 and the retrieved characteristics of the third user. For example, control circuitry 404 determines whether to modify playback of the media asset based on a rank associated with each user.

Figure 10:
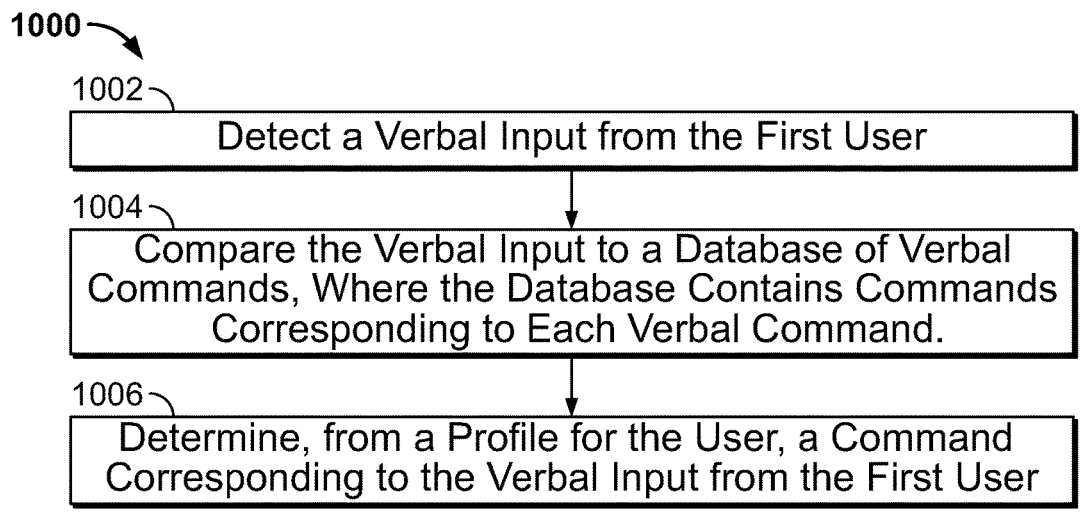
FIG. 10 depicts an illustrative flowchart of a process for determining a command based on the verbal input of the first user, in accordance with some embodiments of the disclosure.

FIG. 10 depicts an illustrative flowchart of a process for determining a command based on verbal input 104 of first user 102, in accordance with some embodiments of the disclosure. Process 1000 begins at 1002, where control circuitry 404 detects a verbal input 104 from first user 102. For example, control circuitry 404 may use an audio sensor to detect verbal input 104 from first user 102. In some instances, the audio sensor may be contained within user television equipment 502, user computer equipment 504, and/or wireless user communications device 506.

At 1004, control circuitry 404 compares verbal input 104 to a database of verbal commands, where the database contains commands corresponding to each verbal command. Control circuitry 404 retrieves the database of verbal commands from storage 408 or over communications network 514. For example, control circuitry 404 compares the verbal input (e.g., "Dinner's ready!") to the database of verbal commands received from storage 408. At 1006, control circuitry 404 determines, from a profile of the user, a command corresponding to the verbal input from first user 102. Control circuitry 404 determines the command corresponding to the verbal input using similar methods as described above. For example, control circuitry 404 may use processing circuitry 406 to compare the verbal input to the database of verbal commands based on keyword matching.

Figure 11:
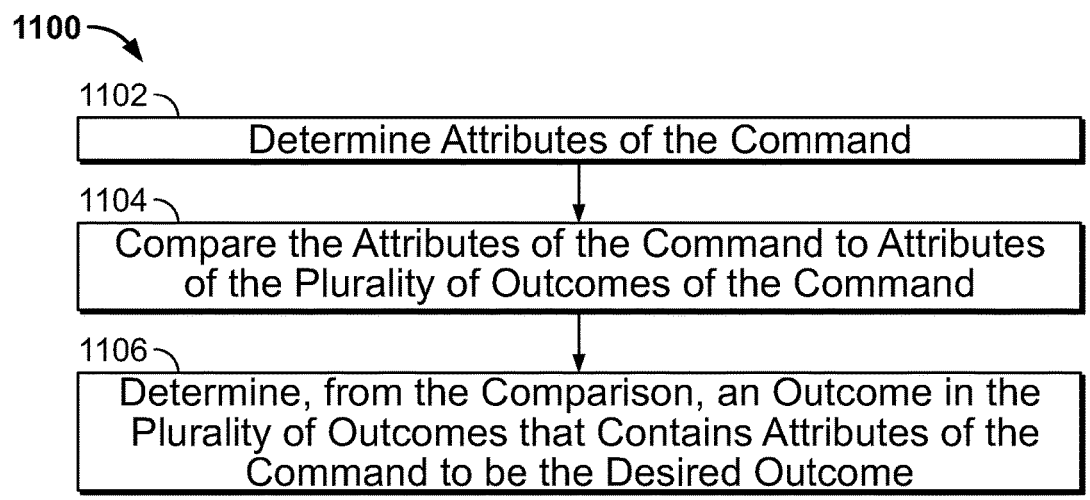
FIG. 11 depicts an illustrative flowchart of a process for determining an outcome based on attributes of the command, in accordance with some embodiments of the disclosure.

FIG. 11 depicts an illustrative flowchart of a process for determining an outcome based on attributes of the command, in accordance with some embodiments of the disclosure. Process 1100 begins at 1102, where control circuitry 404 determines attributes of the command. For example, control circuitry 404 may determine attributes of the command based on analyzing the audio associated with the command, as described above. At 1104, control circuitry 404 compares the attributes of the command to attributes of the plurality of outcomes of the command. For example, control circuitry 404 may compare the attributes of the command to attributes of the plurality of outcomes of the command, which may be retrieved from storage 408.

At 1106, control circuitry 404 determines, from the comparison, an outcome in the plurality of outcomes that contains attributes of the command to be the desired outcome. For example, control circuitry 404 may determine an outcome in the plurality of outcomes with the highest rank to be the desired outcome.

Figure 12:
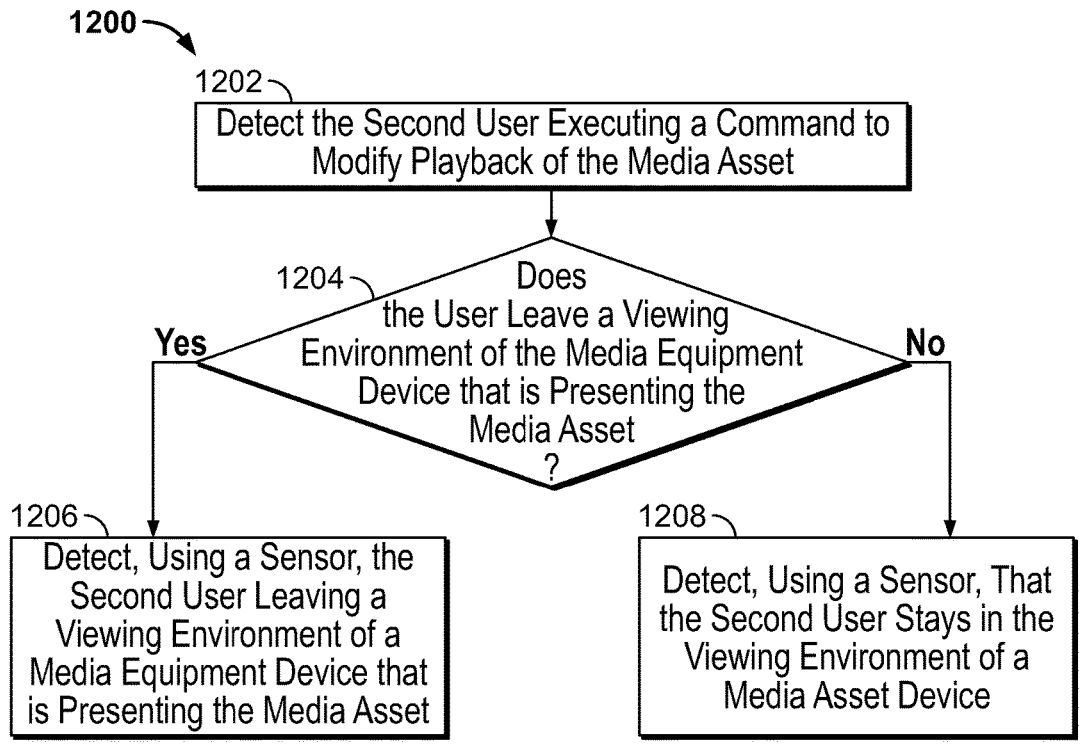
FIG. 12 depicts an illustrative flowchart of a process for detecting whether the user leaves the viewing area of the media equipment device that is presenting the media asset, in accordance with some embodiments of the disclosure.

FIG. 12 depicts an illustrative flowchart of a process for detecting whether second user 106 leaves the viewing area of the media equipment device that is presenting the media asset, in accordance with some embodiments of the disclosure. Process 1200 begins at 1202, where control circuitry 404 detects the second user executing a command to modify playback of the media asset. For example, control circuitry 404 may receive a user input command (e.g., a "pause" command) from user input interface 410 that modifies playback (e.g., pauses the media asset) of the media asset.

At 1204, control circuitry 404 determines whether the user leaves a viewing environment of the media equipment device that is presenting the media asset. If, at 1204, control circuitry 404 determines that "Yes," second user 106 leaves a viewing environment of the media equipment device that is presenting the media asset, process 1204 proceeds to process 1206. At 1206, control circuitry 404 detects, using a sensor, the second user leaving a viewing environment of a media equipment device that is presenting the media asset. For example, control circuitry 404 may use wireless user communications device 506 (e.g., a camera) to track the second user's movements to detect when the second user leaves the viewing environment of the media equipment device that is presenting the media asset.

If, at 1204, control circuitry 404 determines that "No," the user does not leave a viewing environment of the media equipment device that is presenting the media asset, process 1204 proceeds to 1208. At 1208, control circuitry 404 detects, using a sensor, that the second user stays in the viewing environment of a media asset device. For example, control circuitry 404 may use wireless user communications device 506 (e.g., the second user's cell phone) to track the second user's movements, through GPS, to detect that the second has not left the viewing environment of the media equipment device that is presenting the media asset.

Figure 13:
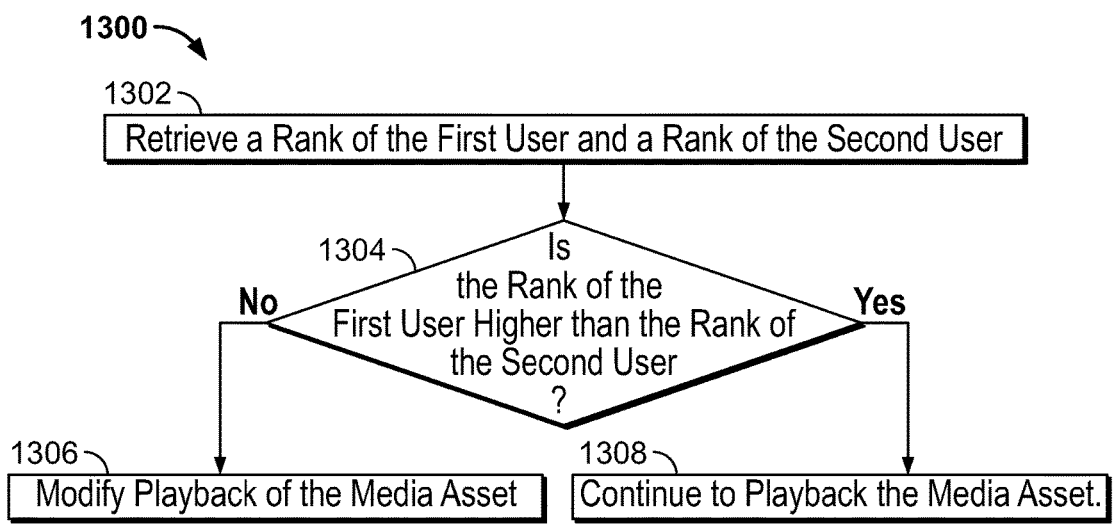
FIG. 13 depicts an illustrative flowchart of a process for modifying playback of the media asset based on the ranks of the users, in accordance with some embodiments of the disclosure.

FIG. 13 depicts an illustrative flowchart of a process for modifying playback of the media asset based on the rank of the users, in accordance with some embodiments of the disclosure. Process 1300 begins at 1302, where control circuitry 404 retrieves a rank of the first user and a rank of the second user. Control circuitry 404 retrieves the rank of the first user and the rank of the second user from a database corresponding to the profiles for the users in storage 408. In some instances, control circuitry 404 retrieves the ranks from communications network 514. For example, control circuitry 404 may retrieve the rank of the first user (e.g., rank of 1 out of 4) and the rank of the second user (e.g., rank of 3 out of 4).

At 1304, control circuitry 404 determines whether the rank of first user 102 is higher than the rank of second user 106. Control circuitry 404 uses processing circuitry 406 to compare the rank of the first user to the rank of the second user. If, at 1304, control circuitry 404 determines that "Yes," the rank of the first user is higher than the rank of the second user, then process 1304 proceeds to process 1306. At 1306, control circuitry 404 modifies playback of the media asset. For example, control circuitry 404 may pause playback of the media asset on user television equipment 502. As another example, the control circuitry 404 may mute the sound of the playback of the media asset through speakers 414. As yet another example, control circuitry 404 may power off display 412 that was displaying playback of the media asset.

If, at 1304, control circuitry 404 determines that "No," the rank of the first user is not higher than the rank of the second user, then process 1304 proceeds to process 1308. At 1308, control circuitry 404 continues to play back the media asset.

Systems and methods are also provided herein for determining whether a user is authorized to perform an action that meets a goal of a sound. A media guidance application may detect a sound generated by a first device external to a media equipment device. The media guidance application may retrieve, from a lookup table, a known goal that is associated with the sound. The media guidance application may detect a user in a viewing environment. The media guidance application may determine an identity of the user. And the media guidance application may modify playback to encourage or discourage the user from achieving the known goal based on the identity of the user.

Figure 14:
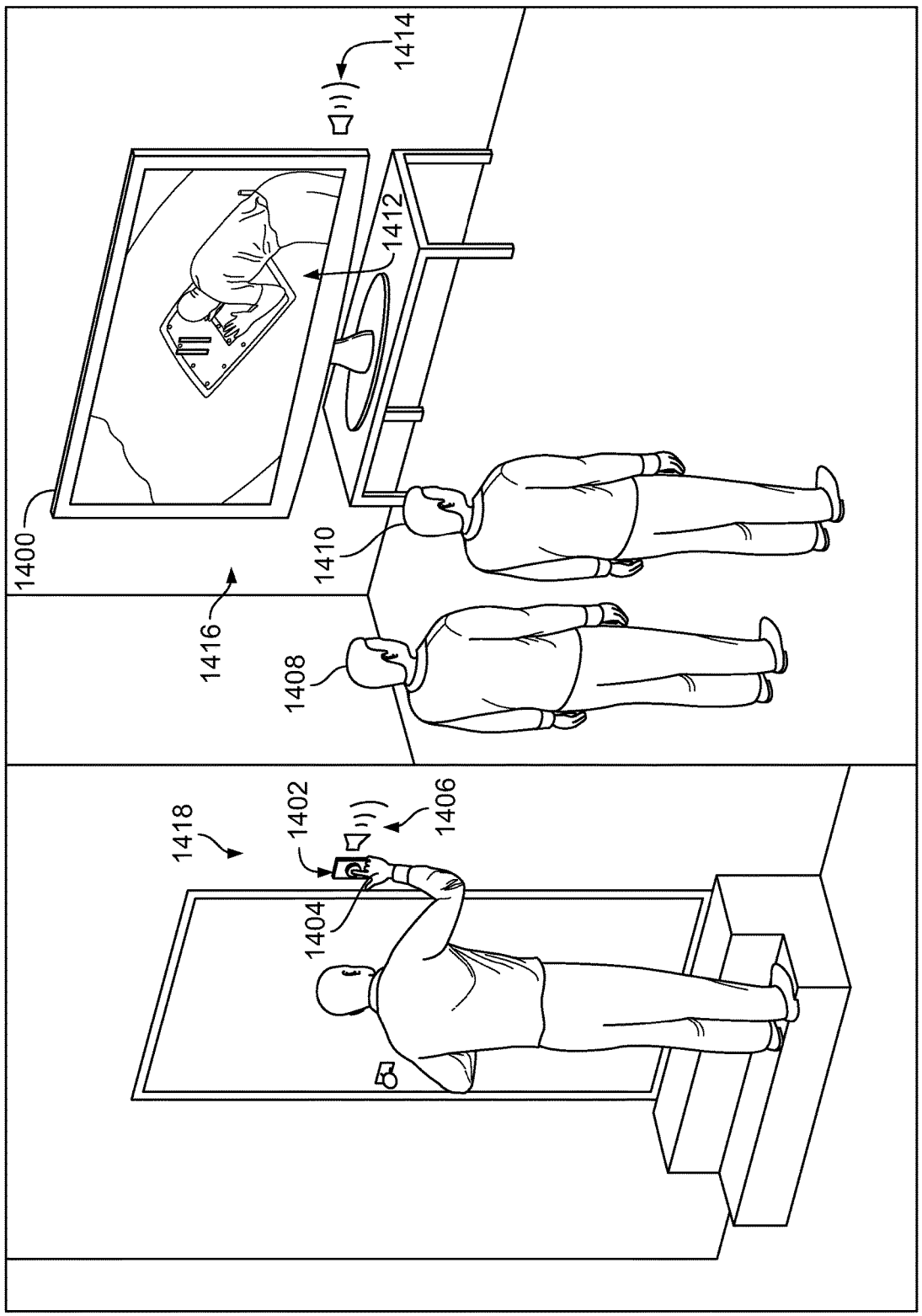
FIG. 14 shows an illustrative embodiment of determining whether a user is authorized to perform an action that meets a goal of a sound, in accordance with some embodiments of the disclosure.

FIG. 14. shows an illustrative embodiment of determining whether a user is authorized to perform an action that meets a goal of a sound, in accordance with some embodiments of the disclosure. FIG. 14 depicts illustrative display 1400, which may be presented by control circuitry that executes a media guidance application on any user equipment. The functionality of user equipment, control circuitry, and the media guidance application is described in further detail with respects to FIGS. 2-5.

The media guidance application may output sound 1406 from first device 1402, in response to detecting action 1404. For example, the media guidance application may output sound 1406 (e.g., a doorbell ringing, smoke alarm, ringtone, etc.), from first device 1402 (e.g., a doorbell, smoke alarm, cell phone, etc.), in response to detecting action 1404 (e.g., a user pressing the doorbell, a smoke alarm detecting smoke, a cell phone ringing). The media guidance application may determine that first user 1408 and second user 1410 are watching playback of media asset 1412, which may include playback audio 1414. The media guidance application may determine that first user 1408 and second user 1410 are watching media asset 1412 in first physical environment 1416. The media guidance application may detect that sound 1406 originates in second physical environment 1418, which may be a separate environment from first environment 1416.

In some embodiments, a media guidance application may detect a sound generated by a first device external to a media equipment device. For example, the media guidance application may detect, using a sensor, a sound (e.g., a doorbell ringing) by a first device (e.g., a doorbell) external to a media equipment device (e.g., a television). The media guidance application may detect a sound generated by the first device using similar methods as detecting a verbal input, as described above.

For example, the media guidance application may detect a sound generated by a first device external to a media equipment device using an intelligent personal assistant (IPA) (e.g., an Amazon Echo, Google Home, Siri, etc.), where the IPA constantly listens for audio inputs in first physical environment 1416 and second physical environment 1418.

In some embodiments, the media guidance application may determine that a network of connected IPAs exist, where each connected IPA exists in its own environment and communicates with other IPAs over a wireless network. For example, the media guidance application may determine that a network of connected IPAs exists (e.g., an Amazon Echo in the living room, a Ring doorbell camera at the front door, etc.) and communicate with one another over a wireless network. In some instances, the network IPAs may be configured in a slave/master setup.

The media guidance application may use a goal associated with the sound (e.g., for a doorbell ringing, the associated goal may be for a user to answer the door) and a potential user action (e.g., pausing playback of media asset 1412 to get up and open the door) to help determine whether the user is authorized to perform the action that meets the goal of the sound. As referred to herein, a "goal associated with the sound" is defined to be a preferred action taken by the user as a result of being informed of the sound. For example, the media guidance application may determine that a goal associated with a doorbell ringing may be for the user to answer the door. As another example, the media guidance application may determine that a goal associated with a smoke alarm beeping may be for the user to exit the house and/or environment containing the smoke alarm. As yet another example, the media guidance application may determine that another goal associated with a smoke alarm beeping may be for the user to change the batteries in the smoke alarm.

The media guidance application may store a database that associates a goal in a plurality of goals with a set of actions in a plurality of actions and a sound in a plurality of sounds. The media guidance application may store the database in a user profile. The values stored in the database (e.g., goals, actions, sounds) may be preset by an editor, and may be edited by user input.

For example, the media guidance application may store a database that associates a goal (e.g., answer the door) in a plurality of goals (e.g., answer the door, do not answer the door, etc.) with a set of actions (e.g., continue watching playback of a media asset and ignore the doorbell) in a plurality of actions (e.g., pause playback of a media asset to answer the door, continue watching playback of a media asset and ignore the doorbell, etc.) and a sound (e.g., a doorbell ringing) in a plurality of sounds (e.g., doorbell ringing, phone ringing, smoke detector beeping, etc.).

The media guidance application may compare attributes of the sound generated by first device 1402 with entries of the database to determine a goal associated with the sound and a corresponding set of actions associated with the goal. For example, the media guidance application may compare sound 1406 generated by first device 1402 (e.g., a doorbell ringing) with entries of the database to determine a goal associated with sound 1406 (e.g., answer the door) and a corresponding set of actions associated with the goal (e.g., pause playback of the media asset, leave viewing environment 1516 to answer the door, etc.).

In some embodiments, when comparing sound 1406 generated by first device 1402 with the database to determine a goal associated with the sound and a corresponding set of actions associated with the goal, the media guidance application may determine a match between sound 1406 and an entry in the database based on characteristics of sound 1406. For example, the media guidance application may use characteristics of sound 1406 (e.g., tone, loudness, frequency, etc.) to match the sound with its corresponding entry in the database.

For example, the media guidance application may determine the characteristics (e.g., attributes) of sound 1406 using sound processing techniques, as described in more detail above. The media guidance application may determine whether there is a match between a sound and an entry by determining if the sound and an entry in a plurality of entries has a threshold amount of characteristics in common. The media guidance application may retrieve the threshold amount from the profile, and the threshold amount may be preset by an editor that may be updated based on user input. For example, the media guidance application may determine that sound 1406 (e.g., doorbell ringing) has a threshold amount of characteristics (e.g., may be three or more characteristics) in common with the entry (e.g., doorbell sound) in a plurality of entries (e.g., doorbell sound, fire alarm sound, phone ringing, etc.).

In some embodiments, when comparing the sound generated by the first device with the database to determine a goal associated with sound 1406 and a corresponding set of actions associated with the goal, the media guidance application may determine a match between sound 1406 and an entry in the database based on a fingerprint of sound 1406. As referred to herein, a "fingerprint" of the sound is a condensed digital summary, deterministically generated from an audio signal, that can be used to identify an audio sample. The media guidance application may compare the fingerprint of the sound with fingerprints of audio associated with each entry in the database. The media guidance application may determine a match between the fingerprints when the fingerprints are the same within a tolerance range, where the tolerance range is stored in the profile and preset by an editor.

The media guidance application may retrieve, from the entry, the goal associated with the sound. For example, the media guidance application may retrieve, from the entry, the goal (e.g., answer the door) associated with the sound (e.g., a doorbell ringing).

The media guidance application may retrieve, from the entry, the corresponding set of actions associated with the goal. For example, the media guidance application may retrieve, from the entry, the corresponding set of actions (e.g., watch playback of the media asset, turn up the volume of playback of the media asset, etc.) associated with the goal (e.g., answer the door).

The media guidance application may detect a user in viewing environment 1416 of the media equipment device. For example, the media guidance application may use a sensor (e.g., a camera) to detect the user in first viewing environment 1416 of the media equipment device (e.g., a television).

In some embodiments, when detecting the user in first viewing environment 1416 of the media device, the media guidance application may detect, using a sensor, a presence of first user 1408 in first viewing environment 1416. For example, the media guidance application may use an infrared sensor to determine a thermal map of first viewing environment 1416, and detect that first user 1408 is in first viewing environment 1416 of the media equipment device (e.g., a television) based on detecting the user's heat signature in the thermal map.

In some embodiments, when detecting first user 1408 in first viewing environment 1416 of the media device, the media guidance application may detect, using a camera, a presence of the user in the viewing environment. For example, the media guidance application may use a camera to detect the user in the viewing environment of the media equipment device (e.g., a television). Systems and methods for detecting a user in a viewing environment of the media equipment device are described in greater detail in Panchaksharaiah et al. U.S. application Ser. No. 15/200,194, filed Jul. 1, 2016, Panchaksharaiah et al. U.S. application Ser. No. 15/200,216, filed Jul. 1, 2016, and Blake et al. U.S. application Ser. No. 15/200,638, filed Jul. 1, 2016, which are hereby incorporated by reference herein in their entireties.

In some embodiments, when detecting first user 1408 in first viewing environment 1416 of the media device, the media guidance application may detect, using Global Positioning System (GPS), a presence of first user 1408 in first viewing environment 1416. For example, the media guidance application may detect, via GPS associated with a user device associated with the user (e.g., the user's cell phone, wearable technology (e.g., an Apple Watch), etc.) the user's location. The media guidance application may determine from the user's location (e.g., GPS coordinates) whether the user is in the viewing environment of the media device, based on the known location of the viewing environment.

The media guidance application may determine, from a user profile of first user 1408, whether the user is authorized to perform an action in the determined set of actions associated with the goal. For example, the media guidance application may retrieve, from an authorization database in the user's profile, whether the user is authorized to perform an action (e.g., leave the viewing environment) associated with the goal (e.g., answer the door). The media guidance application may store the user's authorization status (e.g., either the user is or is not authorized to perform an action) in the authorization database in the user profile, where the authorization status is determined using the methods described below.

In some embodiments, when determining, from a user profile of the user, whether the user is authorized to perform an action in the determined set of actions associated with the goal, the media guidance application may retrieve, from the user profile, a rank for the user. For example, the media guidance application may retrieve a rank for the user (e.g., 8 out of 10).

In some embodiments, the media guidance application may determine that that user's rank is dynamic and may be updated frequently in the user profile. The media guidance application may determine that the user's rank is determined based on multiple factors, including the presence of other users in the viewing environment/house, the age of the user, etc. The media guidance application may determine that a value is assigned dynamically to each factor (e.g., the values may be assigned by comparing the factor to a lookup table of values, where the lookup table values were determined by an editor and may be updated based on user input). For example, the media guidance application may determine that the user's rank is higher when more users are present in the viewing environment and as the user's age increases.

The media guidance application may calculate the user's rank from the multiple factors by retrieving a weight assigned to each factor (e.g., between 0% to 100%). The media guidance application may determine that the weight assigned to each factor is predetermined and assigned by an editor, and it may be updated based on user input. The media guidance application may then calculate, using the weight for each factor and the value for each factor (e.g., by summing for the several factors the products of the weight and value for each factor), a rank (e.g., between 0 and 100) for the user. For example, the media guidance application may calculate, using the weight of each factor (e.g., the user's age weight=50%, the presence of other users in the viewing environment weight=50%) and the value for each factor (e.g., the user's age value=15, the presence of other users in the viewing environment=50) a rank (e.g., 0.5*15+0.5*50=32.5 out of 100) for the user.

The media guidance application may retrieve, from a database, a rank for an action. The media guidance application may determine that the rank for the action is preset by an editor, and may be updated from a user input. For example, the media guidance application may retrieve, from a database, a rank (e.g., 50 out of 100) for an action (e.g., leave the viewing environment).

In some embodiments, the media guidance application may dynamically determine the rank of an action. The media guidance application may use factors such as the users present in the viewing environment/house, the user's age, the risk, etc. to determine the rank. For example, the media guidance application may use sensors to determine whether any other users are present in the viewing environment or house after detecting the sound. In response to determining that no other users are present, the media guidance application may rank the action higher, as it may indicate a situation where the user should not complete the action (e.g., the user is a child home alone, and thus should not answer the door to a stranger). The media guidance application may determine the rank of the action based on factors using similar methods as when determining the rank of the user based on factors, as described above.

As another example, the media guidance application may rank the action according to the risk the action presents. The media guidance application may determine the risk by analyzing the potential outcome of the action. For example, the media guidance application may, using a camera, determine the identity of the person using the user device (e.g., doorbell) to generate the sound. If the media guidance application determines that the person is a stranger (e.g., by using the images generated by the camera to compare the face of the person with faces associated with known users from the user profiles, and determining there is not a match between the person's face and a known user's face), the media guidance application may highly rank the action because it has a higher risk. If the media guidance application determines that the person is not a stranger (e.g., by using the camera to identify the user based on comparing the user to a plurality of users who have user profiles), the media guidance application may rank the action lower because it is a lower risk.

The media guidance application may determine whether the rank for the user exceeds the rank for the action. For example, the media guidance application may determine that the rank for the user (e.g., 8 out of 10) exceeds the rank for the action (e.g., 5 out of 10).

In response to determining that the rank for the user exceeds the rank for the action, the media guidance application may determine that the user is authorized to perform the action. For example, the media guidance application may determine that the user is authorized to perform the action (e.g., leave the viewing environment).

In response to determining that the user is authorized to perform the action, the media guidance application may generate a notification for the user indicating the detected sound. For example, the media guidance application may generate a sound notification for the user (e.g., a doorbell sound) to play over playback of the media asset indicating the detected sound. The media guidance application may play over playback a sound notification that is a clip of the detected sound (e.g., the doorbell ringing, fire alarm, phone call) to alert the user audibly of the source of the detected sound.

In some embodiments, the media guidance application may play back the sound notification for a set amount of time (e.g., 5 seconds) that corresponds to a preset amount of time as determined by an editor, or input by the user. For example, the media guidance application may play over playback of the media asset the doorbell ringing sound for a set amount of time (e.g., 3 seconds) as determined by an editor.

In some embodiments, the media guidance application may play back the sound notification over playback of the media asset until the media guidance application detects an action from the user (e.g., the user pauses playback, the user leaves the viewing environment, etc.). For example, the media guidance application may play back the sound notification (e.g., doorbell ringing) over playback of the media asset until the media guidance application detects action from the user (e.g., the media guidance application detects, via a camera, the user leaving the viewing environment to answer the door).

In some embodiments, when generating a notification for the user indicating the detected sound, the media guidance application may generate an overlay to be displayed on the media equipment device, where the overlay contains a notification for the user about the sound. For example, the media guidance application may generate for display an overlay (e.g., an overlay stating, "The doorbell is ringing!") to be displayed on the media equipment device.

The media guidance application may modify playback of a media asset to allow the user to perform the action associated with the goal. For example, the media guidance application may modify playback of the media asset (e.g., pause a movie the user is watching) to allow the user to perform the action (e.g., leave the viewing environment) associated with the goal (e.g., answer the door).

In some embodiments, the media guidance application may determine to modify playback of the media asset after determining that the user has not performed the action associated with the goal after a threshold amount of time. The media guidance application may retrieve the threshold amount of time from a database in the profile, where the threshold amount of time is preset by an editor for each specific goal. The media guidance application may edit the threshold amount of time for each specific goal based on user input. For example, the media guidance application may determine to modify playback of the media asset after determining that the user has not performed the action (e.g., leaving the viewing environment to answer the door) associated with the goal after a threshold amount of time (e.g., 30 seconds), retrieved from a database in the profile.

In some embodiments, when modifying playback of a media asset to allow the user to perform the action associated with the goal, the media guidance application may retrieve, from the database, a set of playback modifications associated with the goal. For example, the media guidance application may retrieve, from the database, a set of playback modifications (e.g., pause, play, fast-forward, rewind, mute, turn on/off, etc.) associated with the goal.

The media guidance application may select a playback modification from the set of playback modifications based on preferences for the user. The media guidance application may retrieve preferences for the user from the user profile. The preferences for the user may be preset based on user input, or may be determined based on user behavior, or a combination of both. For example, the media guidance application may track the user's command history to determine the user's favorite playback command in response to the user hearing the sound (e.g., a doorbell ringing). The media guidance application may determine the commands performed after the user hears the sound based on comparing the timestamps of the commands with the timestamps of the detected sound. For example, the media guidance application may select a playback modification (e.g., pause) from the set of playback modifications based on preferences for the user (e.g., the user always pauses content before getting up to answer the door).

The media guidance application may modify playback of the media asset based on the selected playback modification. For example, the media guidance application may modify playback of the media asset based on the selected playback modification (e.g., pause playback of the media asset). As another example, the media guidance application may modify playback of the media asset based on the selected playback modification by muting playback of the media asset, stopping playback of the media asset, turning off playback of the media asset, or any other similar playback modification.

In response to determining that the user is not authorized to perform the action, the media guidance application may generate a notification for a second user to perform the action. For example, the media guidance application may generate a notification (e.g., send an SMS message to second user 1410, send an audio alert to second user 1410's personal device, or generate an overlay with instructions for second user 1410 to be displayed over the media asset) to perform the action (e.g., answer the door).

In some embodiments, the media guidance application may determine whether the user can hear the sound and therefore be tempted to perform the action in response to the sound.

In some embodiments, the media guidance application may determine that the sound is within an audible range of the viewing environment. For example, the media guidance application may detect the sound using a sensor (e.g., a microphone) contained within the viewing environment. The media guidance application may compare the detected sound's loudness with the minimum loudness value (retrieved from the profile) the sound can have and still be in the audible range.

In response to determining that the user is not authorized to perform the action, the media guidance application may prevent the user from modifying playback of the media asset. For example, the media guidance application may prevent the user from modifying playback of the media guidance application (e.g., not allowing the user to pause playback of the media asset).

The media guidance application may modify playback of the media asset to prevent the user from performing the action associated with the goal. For example, the media guidance application may increase the volume of playback of the media asset to drown out the sound from the user's audible range.

In some embodiments, when modifying playback of the media asset, the media guidance application may determine a volume that dampens the sound that is within the audible range. For example, the media guidance application may determine a volume that is equivalent to or higher than the determined volume of the sound within the audible range.

The media guidance application may adjust a volume corresponding to playback of the media asset to be the volume that dampens the sound. For example, the media guidance application may adjust the playback volume of the media asset to be a volume that is higher than the detected volume of the sound in the audible range.

Figure 15:
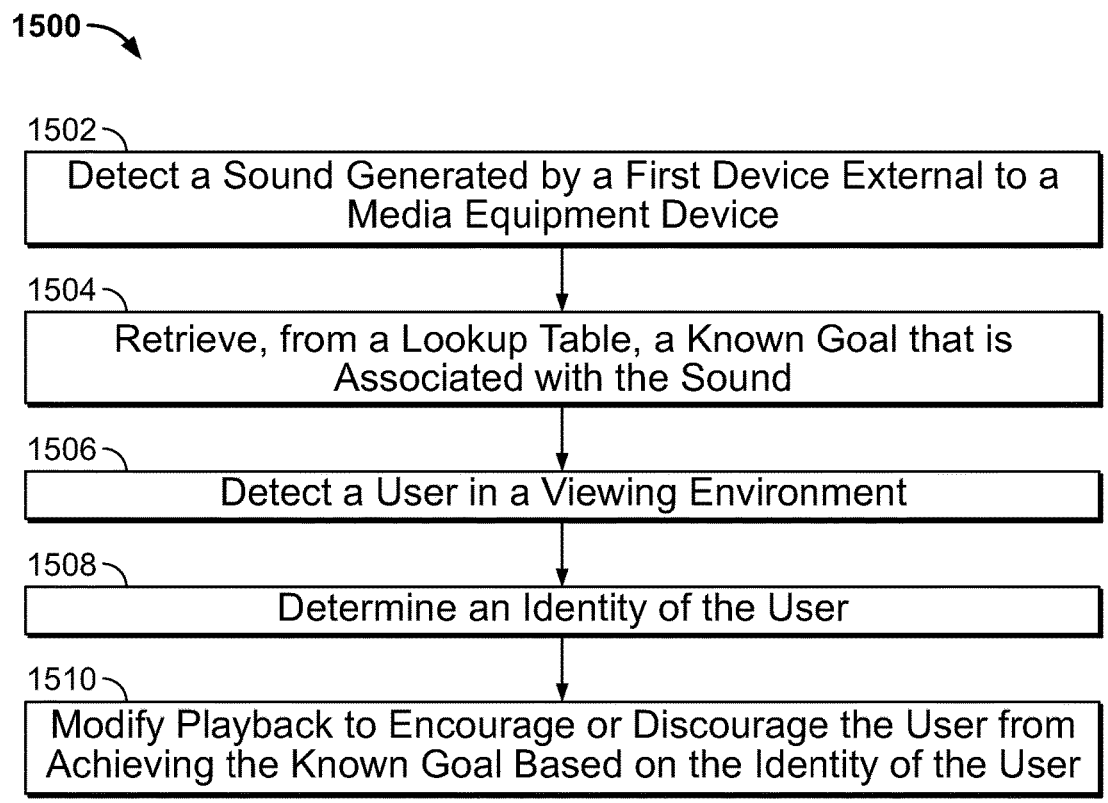
FIG. 15 depicts an illustrative flowchart of a process for determining whether a user is authorized to perform an action that meets a goal of a sound, in accordance with some embodiments of the disclosure.

FIG. 15 depicts an illustrative flowchart of a process for determining whether a user is authorized to perform an action that meets a goal of a sound, in accordance with some embodiments of the disclosure. Process 1500 begins at 1502, where control circuitry 404 detects sound 106 generated by first device 102 external to a media equipment device. For example, control circuitry 404 may detect sound 106 (e.g., a doorbell ringing) generated by first device 102 (e.g., a doorbell), or speakers 414, external to a media equipment device (e.g., a television).

At 1504, control circuitry 404 retrieves, from a lookup table, a known goal that is associated with the sound. Control circuitry 404 may retrieve the known goal from a lookup table stored in storage 408 or media guidance data source 518. Control circuitry 404 may also retrieve the known goal from a lookup table from communications network 514. For example, control circuitry 404 may retrieve a known goal (e.g., answer the door) that is associated with sound 1406 (e.g., a doorbell ringing). At 1506, control circuitry 404 detects a user in a viewing environment. For example, control circuitry 404 may detect a user in a viewing environment using a sensor. At 1508, control circuitry 404 determines an identity of first user 1408. Control circuitry 404 may determine the identity of the user using the methods described above. At 1510, control circuitry 404 modifies playback to encourage or discourage first user 1408 from achieving the known goal based on the identity of first user 1408. For example, control circuitry 404 may modify playback (e.g., pause playback) to encourage first user 1408 to achieve the known goal (e.g., answer the door) based on the identity of first user 1408 (e.g., the homeowner).

Figure 16:
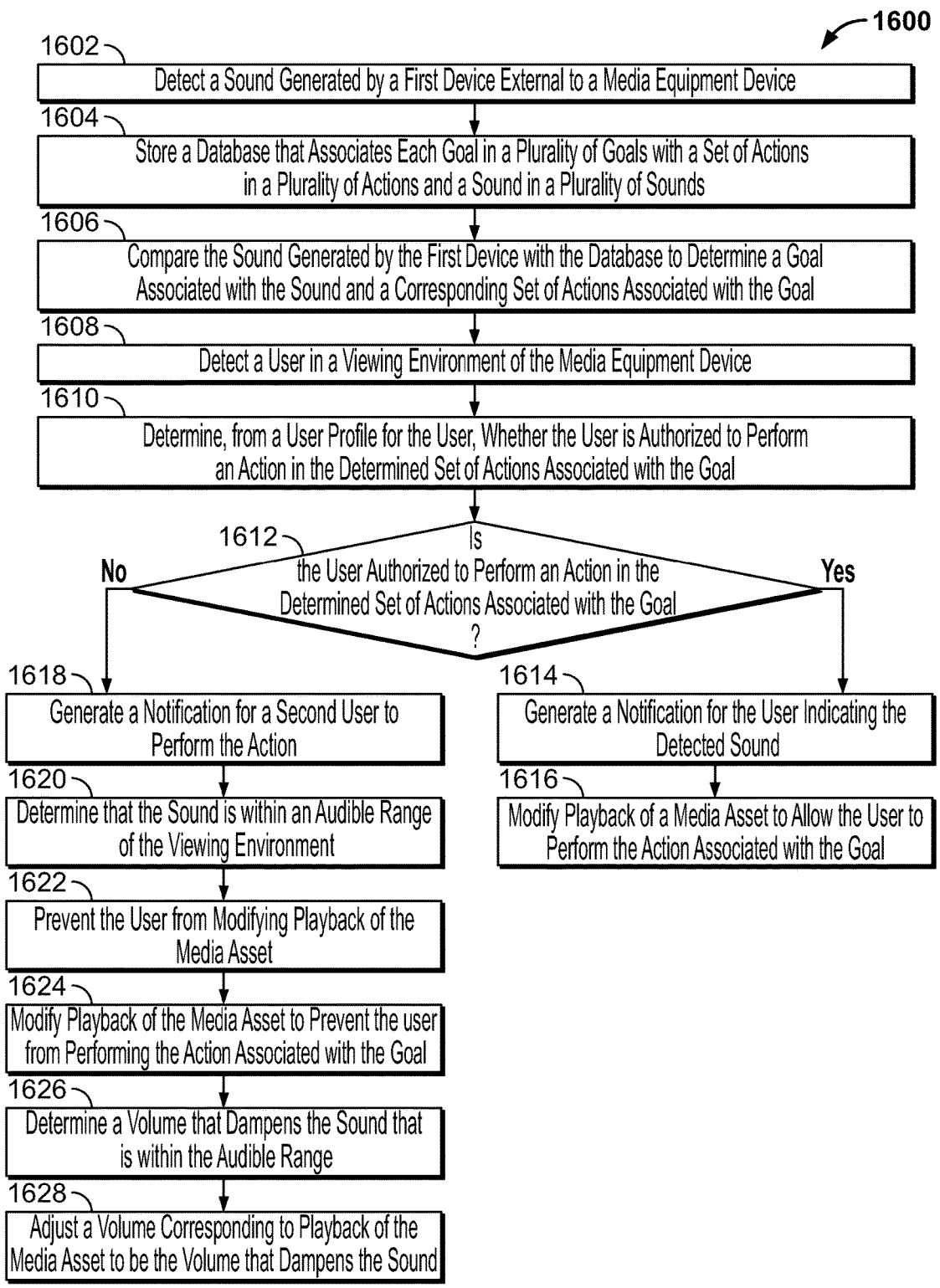
FIG. 16 depicts another illustrative flowchart of a process for determining whether a user is authorized to perform an action that meets a goal of a sound, in accordance with some embodiments of the disclosure.

FIG. 16 depicts an illustrative flowchart of a process for determining whether a user is authorized to perform an action that meets a goal of sound 1406, in accordance with some embodiments of the disclosure. At 1602, control circuitry 404 detects sound 1406 generated by a first device external to a media equipment device. For example, control circuitry 404 may detect sound 1406 (e.g., a doorbell ringing) generated by first device 1402 (e.g., doorbell) external to a media equipment device.

At 1604, control circuitry 404 stores a database that associates each goal in a plurality of goals with a set of actions in a plurality of actions and a sound in a plurality of sounds. Control circuitry 404 stores the database in storage 408 or media guidance data source 518, or retrieves the database via communications network 514.

At 1606, control circuitry 404 compares sound 1406 generated by the first device with the database to determine a goal associated with sound 1406 and a corresponding set of actions associated with the goal. At 1608, control circuitry 404 detects a user in a viewing environment of the media equipment device. For example, control circuitry 404 may use an infrared sensor to detect a user in a viewing environment of the media equipment device. At 1610, control circuitry 404 determines, from a user profile of user 1408, whether user 1408 is authorized to perform an action in the determined set of actions associated with the goal. Control circuitry 404 determines whether the user is authorized to perform an action using similar methods as described above.

At 1612, control circuitry 404 determines whether user 1408 is authorized to perform an action in the determined set of actions associated with the goal. If, at 1612, control circuitry 404 determines that "Yes," user 1408 is authorized to perform an action in the determined set of actions associated with the goal, then process 1612 proceeds to process 1614. At 1614, control 404 generates a notification for the user indicating detected sound 1406. For example, control circuitry may generate an overlay on display 412 for the user indicating the detected sound. At 1616, control circuitry 404 modifies playback of a media asset to allow user 1408 to perform the action associated with the goal. For example, control circuitry 404 may mute playback of media asset 1412 to allow the user to perform the action (e.g., leave the viewing environment) associated with the goal (e.g., answer the door).

If, at 1612, control circuitry 404 determines that "No," user 1408 is not authorized to perform an action in the determined set of actions associated with the goal, then process 1612 proceeds to process 1618. At 1618, control circuitry 404 generates a notification for second user 1410 to perform the action. For example, control circuitry 404 may generate an SMS message to wireless communication device 506 for a second user (e.g., an adult in the household) to perform the action (e.g., answer the door). At 1620, control circuitry 404 determines that the sound is within an audible range of the viewing environment. For example, control circuitry 404 may use a microphone to detect whether the sound is within an audible range of the viewing environment, as described above. At 1622, control circuitry 404 may prevent user 1408 from modifying playback of the media asset. For example, control circuitry 404 may not be responsive to user 1408 commands entered by the user via user input interface 410.

At 1624, control circuitry 404 modifies playback of the media asset to prevent user 1408 from performing the action associated with the goal. At 1626, control circuitry 404 determines a volume that dampens sound 1406 that is within the audible range. Control circuitry 404 determines the volume that dampens the sound using similar methods as described above.

At 1628, control circuitry 404 adjusts a volume corresponding to playback of the media asset (e.g., audio playback 1414) to be the volume that dampens user 1408.

Figure 17:
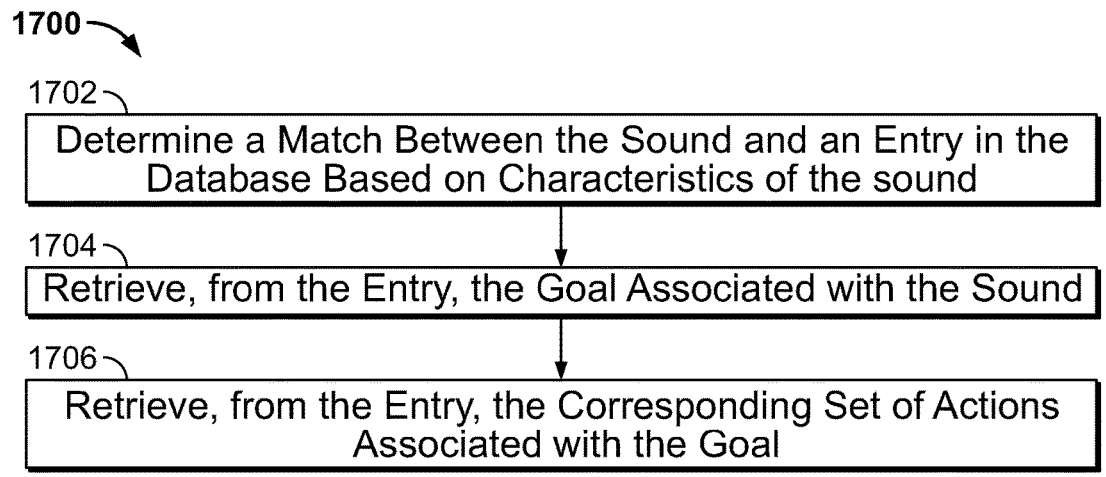
FIG. 17 depicts an illustrative flowchart of a process for identifying the goal associated with the sound, in accordance with some embodiments of the disclosure.

FIG. 17 depicts an illustrative flowchart of a process for determining the goal associated with sound 1406, in accordance with some embodiments of the disclosure. Process 1700 begins at 1702, where control circuitry 404 determines a match between sound 1406 and an entry in the database based on characteristics of the sound. For example, control circuitry 404 may determine a match between sound 1406 (e.g., a doorbell ringing) and an entry in the database based on characteristics of the sound (e.g., tone, loudness, etc.). At 1704, control circuitry 404 retrieves, from the entry, the goal associated with sound 1406. For example, control circuitry 404 may retrieve, from the entry, the goal (e.g., answer the door) associated with the sound (e.g., doorbell ringing). At 1706, control circuitry 404 retrieves, from the entry, the corresponding set of actions associated with the goal. For example, control circuitry 404 may retrieve, from the entry, the corresponding set of actions (e.g., pause playback, answer the door, etc.) associated with the goal (e.g., answer the door).

Figure 18:
FIG. 18 depicts an illustrative flowchart of a process for detecting the presence of the user in the viewing environment, in accordance with some embodiments of the disclosure.

FIG. 18 depicts an illustrative flowchart of a process for detecting the presence of the user in the viewing environment, in accordance with some embodiments of the disclosure. Process 1800 begins at 1802, where control circuitry 404 detects, using a sensor, a presence of user 1408 in the viewing environment. Control circuitry 404 may connect to a sensor via communications network 514. For example, control circuitry 404 may detect, using an infrared sensor, the presence of the user in the viewing environment.

Figure 19:
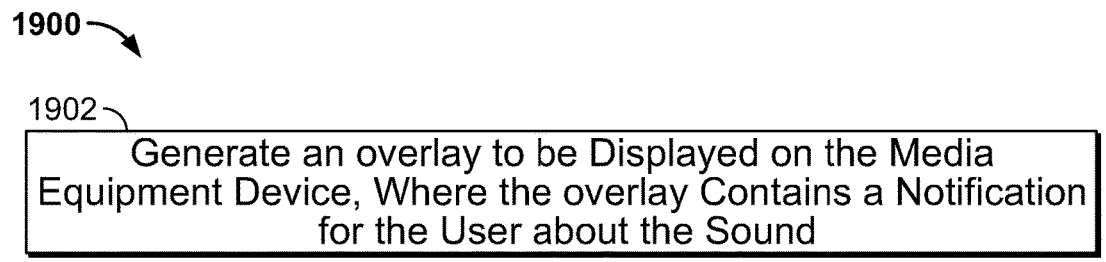
FIG. 19 depicts an illustrative flowchart of a process for generating an overlay containing a notification, in accordance with some embodiments of the disclosure.

FIG. 19 depicts an illustrative flowchart of a process for generating an overlay containing a notification, in accordance with some embodiments of the disclosure. Process 1900 begins at 1902, where control circuitry 404 generates an overlay to be displayed on the media equipment device, where the overlay contains a notification for user 1408 about sound 1406. Control circuitry 404 may generate an overlay to be displayed on display 412. For example, control circuitry 404 may generate an overlay to be displayed on the media equipment device (e.g., a television), where the overlay contains a notification for the user about the sound (e.g., an overlay with text that reads "The doorbell is ringing.").

Figure 20:
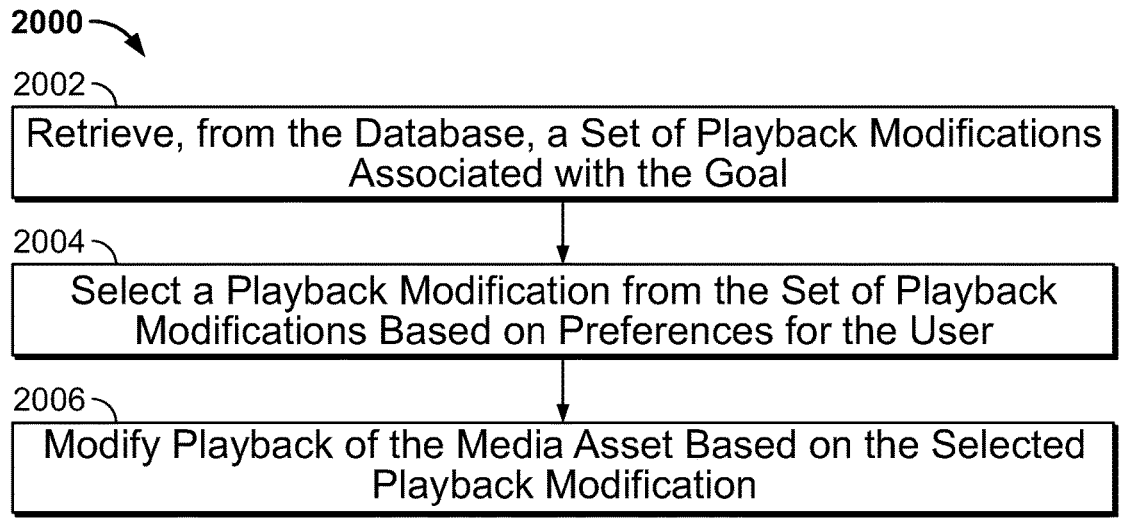
FIG. 20 depicts an illustrative flowchart of a process for modifying playback of the media asset, in accordance with some embodiments of the disclosure.

FIG. 20 depicts an illustrative flowchart of a process for modifying playback of the media asset, in accordance with some embodiments of the disclosure. Process 2000 begins at 2002, where control circuitry 404 retrieves, from the database, a set of playback modifications associated with the goal. Control circuitry 404 may retrieve the set of playback modifications from the database stored in storage 408 or media guidance data source 518, or via communications network 514. For example, control circuitry 404 may retrieve, from the database, a set of playback modifications (e.g., pause playback, mute playback, etc.) associated with the goal (e.g., answer the door).

At 2004, control circuitry 404 selects a playback modification from the set of playback modifications based on preferences for user 1408. For example, control circuitry 404 may select a playback modification (e.g., pause playback) based on preferences for user 1408 (e.g., the user prefers not to miss content when answering the door). At 2006, control circuitry 404 modifies playback of the media asset based on the selected playback modification. For example, control circuitry 404 may pause playback of the media asset based on the selected playback modification (e.g., to pause playback).

Figure 21:
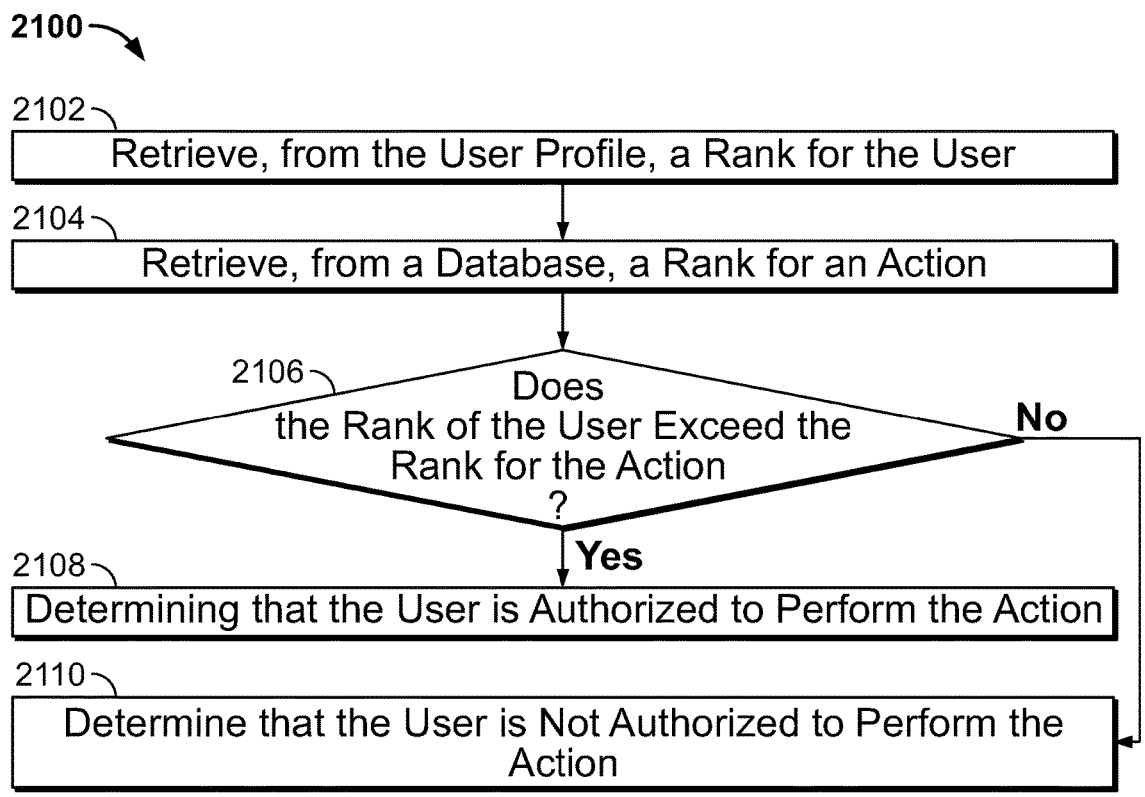
FIG. 21 depicts an illustrative flowchart of a process for determining whether the user is authorized to perform the action, in accordance with some embodiments of the disclosure.

FIG. 21 depicts an illustrative flowchart of a process for determining whether user 1408 is authorized to perform the action, in accordance with some embodiments of the disclosure. Process 2100 begins at 2102, where control circuitry 404 retrieves, from the user profile, a rank for user 1408. Control circuitry 404 retrieves the rank for user 1408 from the user profile stored in storage 408 or media guidance data source 518, or via communications network 514. For example, the media guidance application may retrieve the rank (e.g., 8 out of 10) for user 1408 from the user profile in storage 408. At 2104, control circuitry 404 retrieves, from a database, a rank for an action. For example, control circuitry 404 may retrieve, from a database in storage 408, a rank for an action (e.g., 5 out of 10).

At 2106, control circuitry 404 determines whether the rank of user 1408 exceeds the rank for the action. If, at 2106, control circuitry 404 determines that "Yes," the rank of the user exceeds the rank of the action, process 2106 proceeds to 2108. At 2108, control circuitry 404 determines that user 1408 is authorized to perform the action. If, at 2106, control circuitry 404 determines that "No," the rank of user 1408 does not exceed the rank of the action, process 2106 proceeds to 2110. At 2110, control circuitry 404 determines that user 1408 is not authorized to perform the action.

It should be noted that processes 600-1300 and 1400-2100 or any step thereof could be performed on, or provided by, any of the devices shown in FIGS. 1 and 4-5. For example, any of processes 600-1300 and 1400-2100 may be executed by control circuitry 404 (FIG. 4) as instructed by control circuitry implemented on user equipment 502, 504, 506 (FIG. 5), and/or a user equipment device for selecting a recommendation. In addition, one or more steps of processes 600-1300 and 1400-2100 may be incorporated into or combined with one or more steps of any other process or embodiment.

It is contemplated that the steps or descriptions of each of FIGS. 6-13 and 14-21 may be used with any other embodiment of this disclosure. In addition, the steps and descriptions described in relation to FIGS. 6-13 and 14-21 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1 and 4-5 could be used to perform one or more of the steps in FIGS. 6-13 and 14-21.

It will be apparent to those of ordinary skill in the art that methods involved in the present invention may be embodied in a computer program product that includes a computer-usable and/or readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present disclosure may be executed using processing circuitry. For instance, determining a position of a user may be performed, e.g., by processing circuitry 406 of FIG. 4. The processing circuitry, for instance, may be a general purpose processor, a customized integrated circuit (e.g., an ASIC), or a field-programmable gate array (FPGA) within user equipment 400, media content source 516, or media guidance data source 518. For example, a profile, as described herein, may be stored in, and retrieved from, storage 408 of FIG. 4, or media guidance data source 518 of FIG. 5. Furthermore, processing circuitry, or a computer program, may update settings of user equipment 100 stored within storage 408 of FIG. 4 or media guidance data source 518 of FIG. 5.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may make reference to "related art" or "convention," any such reference is merely for the purpose of providing context to the invention(s) of the instant disclosure, and does not form any admission as to what constitutes the state of the art.

What is claimed is:

1. A method for translating an irrelevant command into a pertinent playback modification to encourage a recipient of the command to execute on the command, the method comprising:
    detecting a command from a first user to a second user;
    comparing the command to a set of playback operation commands for a media asset that is currently being played back by the second user;
    in response to the comparing, determining that the command is not contained within the set of playback operation commands;

determining, based on a user profile of the first user and a user profile of the second user, a desired outcome of the command from a plurality of outcomes of the command;

detecting an action executed by the second user;

comparing the action of the second user to the desired outcome of the command;

in response to determining that the action of the second user does not correspond to the desired outcome of the command, retrieving characteristics of the second user from the user profile of the second user; and determining whether to modify playback of the media asset based on the command detected from the first user and the retrieved characteristics of the second user.

2. The method of claim 1, wherein determining whether to modify playback of the media asset based on the command detected from the first user and the retrieved characteristics of the second user comprises:

comparing a characteristic from the retrieved characteristics of the second user to the command, wherein the characteristic is selected from a group of characteristics consisting of age, rank, relationship to other users, and time of day, and wherein the command is selected from a group of commands consisting of, eating, cleaning, studying, cooking, and sleeping;

determining, from the comparison, whether the command shares a characteristic of the second user; and in response to determining that the command shares the characteristic, modifying playback of the media asset.

3. The method of claim 1, further comprising:

detecting a command from the first user to the second user and a third user;

determining, based on a user profile of the first user, the user profile of the second user and a user profile of the third user, a desired outcome of the command from a plurality of outcomes of the command;

detecting a first action executed by the second user and a second action executed by the third user;

comparing the action of the second user and the action of the third user to the desired outcome of the command;

in response to determining that the action of the of the second user and the action of the third user do not correspond to the desired outcome of the command, retrieving characteristics of the second user from the user profile of the second user and characteristics of the third user from a user profile of the third user; and determining whether to modify playback of the media asset based on the command detected from the first user and the retrieved characteristics of the second user and the retrieved characteristics of the third user.

4. The method of claim 1, wherein detecting the command from the first user comprises:

detecting verbal input from the first user;

comparing the verbal input to a database of commands, wherein the database contains commands corresponding to each verbal input; and determining, from the comparison, a command corresponding to the verbal input from the first user.

5. The method of claim 4, wherein determining, from the comparison, the command corresponding to the verbal input from the first user comprises:

determining a match between the verbal input and the database of verbal commands; and determining a command corresponding to the match to be the command corresponding to the verbal input from the first user.

6. The method of claim 1, wherein determining, based on the user profile of the first user and the user profile of the second user, the desired outcome of the command from the plurality of outcomes of the command further comprises:

determining attributes of the command;

comparing the attributes of the command to attributes of the plurality of outcomes of the command; and determining, from the comparison, an outcome in the plurality of outcomes that contains attributes of the command to be the desired outcome.

7. The method of claim 1, wherein detecting the action executed by the second user comprises:

detecting, using a sensor, the second user leaving a viewing environment of a media equipment device that is presenting the media asset.

8. The method of claim 1, wherein detecting the action executed by the second user comprises:

detecting the second user executing a command to modify playback of the media asset.

9. The method of claim 1, wherein detecting the action executed by the second user comprises:

detecting, using a sensor, that the second user stays in the viewing environment of a media asset device.

10. The method of claim 1, wherein determining whether to modify playback of the media asset based on the command detected from the first user and the retrieved characteristics of the second user comprises:

retrieving a rank of the first user and a rank of the second user;

determining, from the rank, whether the first user is ranked higher than the second user;

in response to determining that the first user is ranked higher than the second user, modifying playback of the media asset; and in response to determining that the second user is ranked higher than the first user, continuing to playback the media asset.

11. A system for translating an irrelevant command into a pertinent playback modification to encourage a recipient of the command to execute on the command, the system comprising:

control circuitry configured to:

detect a command from a first user to a second user;

compare the command to a set of playback operation commands for a media asset that is currently being played back by the second user;

in response to the comparing, determine that the command is not contained within the set of playback operation commands;

determine, based on a user profile of the first user and a user profile of the second user, a desired outcome of the command from a plurality of outcomes of the command;

detect an action executed by the second user;

compare the action of the second user to the desired outcome of the command;

in response to determining that the action of the second user does not correspond to the desired outcome of the command, retrieve characteristics of the second user from the user profile of the second user; and determine whether to modify playback of the media asset based on the command detected from the first user and the retrieved characteristics of the second user.

12. The system of claim 11, wherein the control circuitry is configured to determine whether to modify playback of the media asset based on the command detected from the first user and the retrieved characteristics of the second user by:

comparing a characteristic from the retrieved characteristics of the second user to the command, wherein the characteristic is selected from a group of characteristics consisting of age, rank, relationship to other users, and time of day, and wherein the command is selected from a group of commands consisting of, eating, cleaning, studying, cooking, and sleeping;

determining, from the comparison, whether the command shares a characteristic of the second user; and in response to determining that the command shares the characteristic, modifying playback of the media asset.

13. The system of claim 11, wherein the control circuitry is further configured to:

detect a command from the first user to the second user and a third user;

determine, based on a user profile of the first user, the user profile of the second user and a user profile of the third user, a desired outcome of the command from a plurality of outcomes of the command;

detect a first action executed by the second user and a second action executed by the third user;

compare the action of the second user and the action of the third user to the desired outcome of the command;

in response to determining that the action of the of the second user and the action of the third user do not correspond to the desired outcome of the command, retrieve characteristics of the second user from the user profile of the second user and characteristics of the third user from a user profile of the third user; and determine whether to modify playback of the media asset based on the command detected from the first user and the retrieved characteristics of the second user and the retrieved characteristics of the third user.

14. The system of claim 11, wherein the control circuitry is configured to detect the command from the first user by:

detecting verbal input from the first user;

comparing the verbal input to a database of commands, wherein the database contains commands corresponding to each verbal input; and determining, from the comparison, a command corresponding to the verbal input from the first user.

15. The method of claim 14, wherein the control circuitry is configured to determine, from the comparison, the command corresponding to the verbal input from the first user by:

determining a match between the verbal input and the database of verbal commands; and determining a command corresponding to the match to be the command corresponding to the verbal input from the first user.

16. The system of claim 11, wherein the control circuitry is further configured to determine, based on the user profile of the first user and the user profile of the second user, the desired outcome of the command from the plurality of outcomes of the command by:

determining attributes of the command;

comparing the attributes of the command to attributes of the plurality of outcomes of the command; and determining, from the comparison, an outcome in the plurality of outcomes that contains attributes of the command to be the desired outcome.

17. The system of claim 11, wherein the control circuitry is configured to detect the action executed by the second user by:

detecting, using a sensor, the second user leaving a viewing environment of a media equipment device that is presenting the media asset.

18. The system of claim 11, wherein the control circuitry is configured to detect the action executed by the second user by:

detecting the second user executing a command to modify playback of the media asset.

19. The system of claim 11, wherein the control circuitry is configured to detect the action executed by the second user by:

detecting, using a sensor, that the second user stays in the viewing environment of a media asset device.

20. The system of claim 11, wherein the control circuitry is configured to determine whether to modify playback of the media asset based on the command detected from the first user and the retrieved characteristics of the second user by:

retrieving a rank of the first user and a rank of the second user;

determining, from the rank, whether the first user is ranked higher than the second user;

in response to determining that the first user is ranked higher than the second user, modifying playback of the media asset; and in response to determining that the second user is ranked higher than the first user, continuing to playback the media asset.

* * * * *